United States Patent [19]
Sahori et al.

[11] Patent Number: 6,074,107
[45] Date of Patent: *Jun. 13, 2000

[54] CAMERA SYSTEM

[75] Inventors: Daisuke Sahori; Takayuki Tsuboi, both of Kanagawa-ken, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/747,725

[22] Filed: Nov. 12, 1996

Related U.S. Application Data

[63] Continuation of application No. 08/307,488, Sep. 16, 1994, abandoned, which is a continuation of application No. 07/984,253, Dec. 1, 1992, abandoned, which is a continuation of application No. 07/666,447, Mar. 11, 1991, abandoned, which is a continuation of application No. 07/427,693, Oct. 27, 1989, abandoned.

[30] Foreign Application Priority Data

| Oct. 31, 1988 | [JP] | Japan | 63-276861 |
| Oct. 31, 1988 | [JP] | Japan | 63-276862 |
| Oct. 31, 1988 | [JP] | Japan | 63-276863 |
| Oct. 31, 1988 | [JP] | Japan | 63-276864 |
| Oct. 31, 1988 | [JP] | Japan | 63-276865 |

[51] Int. Cl.[7] .......................... G03B 17/26; G03B 17/02
[52] U.S. Cl. .......................... 396/513; 396/514; 396/516; 396/538
[58] Field of Search .................. 396/512, 513, 396/514, 511, 516, 535, 538

[56] References Cited

U.S. PATENT DOCUMENTS

| 3,724,353 | 4/1973 | Holbert | 95/90 |
| 3,896,459 | 7/1975 | Ogawa et al. | 354/145 |
| 4,221,479 | 9/1980 | Harvey | 354/275 |
| 4,240,734 | 12/1980 | Nomura et al. | 354/288 |
| 4,572,641 | 2/1986 | Ishihara et al. | 354/288 B |
| 4,779,110 | 10/1988 | Stella | 396/513 |
| 4,802,633 | 2/1989 | Beery | 354/275 |
| 4,841,317 | 6/1989 | Hanson | 396/516 |
| 4,841,319 | 6/1989 | Hansen | 354/275 |
| 4,890,130 | 12/1989 | Takei et al. | 354/288 |
| 4,962,401 | 10/1990 | Takahashi | 354/275 |
| 4,987,436 | 1/1991 | Misawa | 354/203 |
| 5,155,514 | 10/1992 | Tamamura | 354/194 |
| 5,187,514 | 2/1993 | Ikeyour | 354/275 |
| 5,202,713 | 4/1993 | Hakai et al. | 354/212 |
| 5,220,371 | 6/1993 | Tanii et al. | 354/212 |
| 5,258,794 | 11/1993 | Woltz et al. | 354/275 |
| 5,274,408 | 12/1993 | Fujisawa et al. | 354/193.11 |
| 5,368,664 | 11/1994 | Sugiyaut et al. | 156/94 |

FOREIGN PATENT DOCUMENTS

| 1-191836 | 8/1989 | Japan . |
| 652228 | 3/1946 | United Kingdom | 352/78 R |

*Primary Examiner*—Safet Matjahic
*Assistant Examiner*—Christopher Mahoney
*Attorney, Agent, or Firm*—Fitzpatrick, Cella, Harper & Scinto

[57] ABSTRACT

A camera system has a film cartridge provided with a first shaft around which an unexposed film is wound, a second shaft for taking up an exposed film and a movable third shaft which causes a portion of the film which has been sent out from the first shaft to be folded back in a U-turn way so that the portion of the film is allowed to be taken up around the second shaft, and a camera capable of being loaded with the film cartridge and provided with a moving mechanism for moving, when the film cartridge has been loaded, the third shaft of the film cartridge so as to make an exposure.

11 Claims, 18 Drawing Sheets

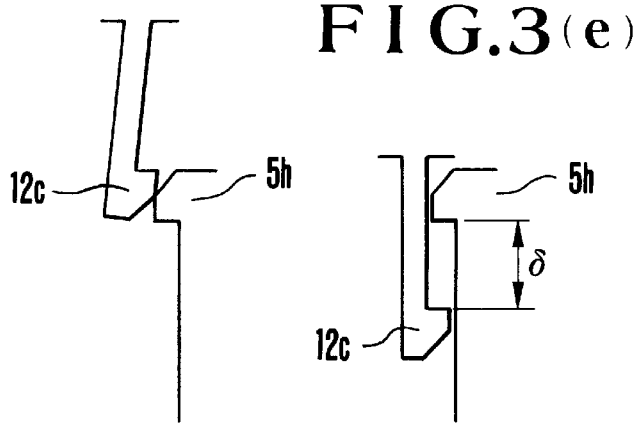
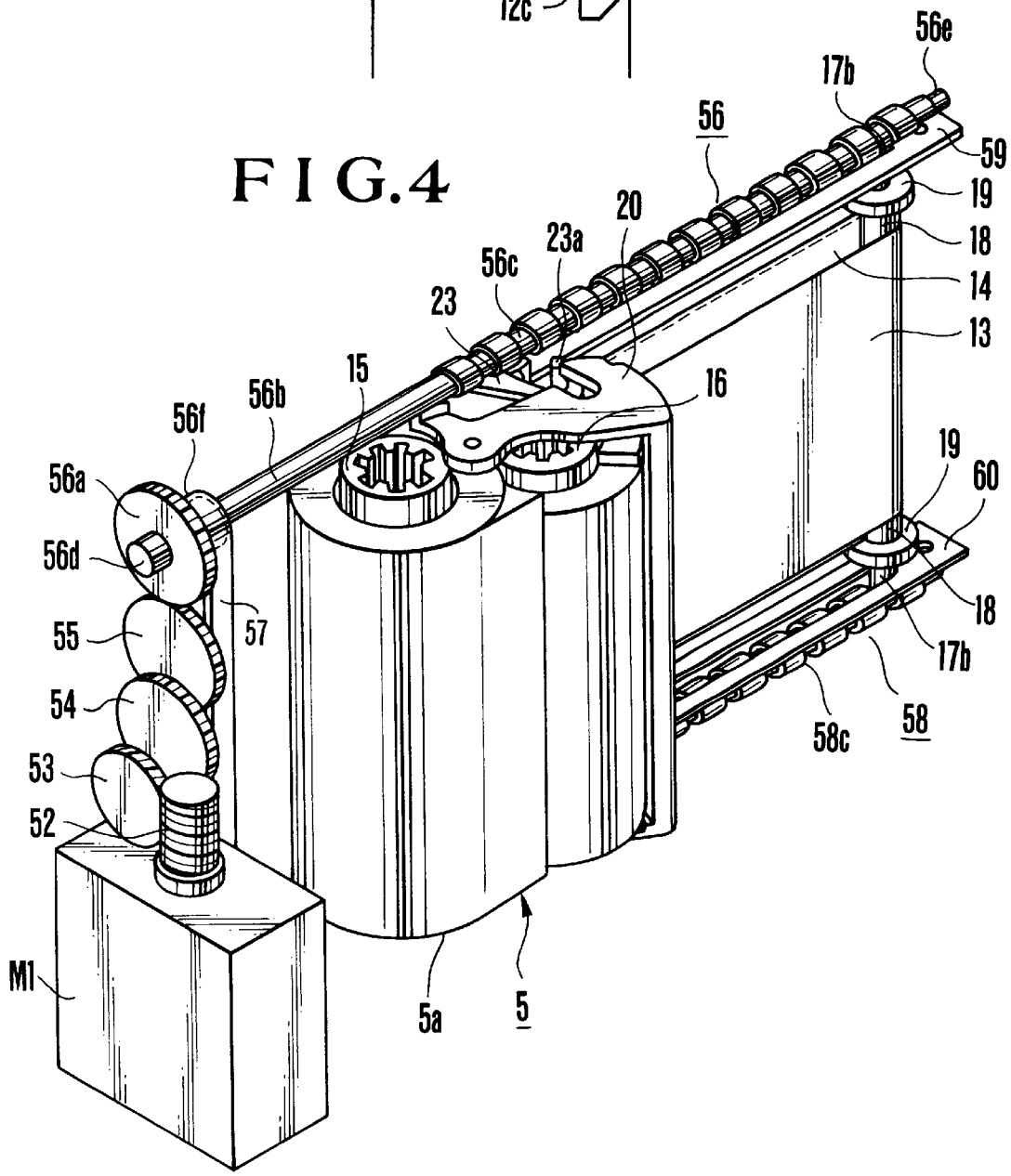

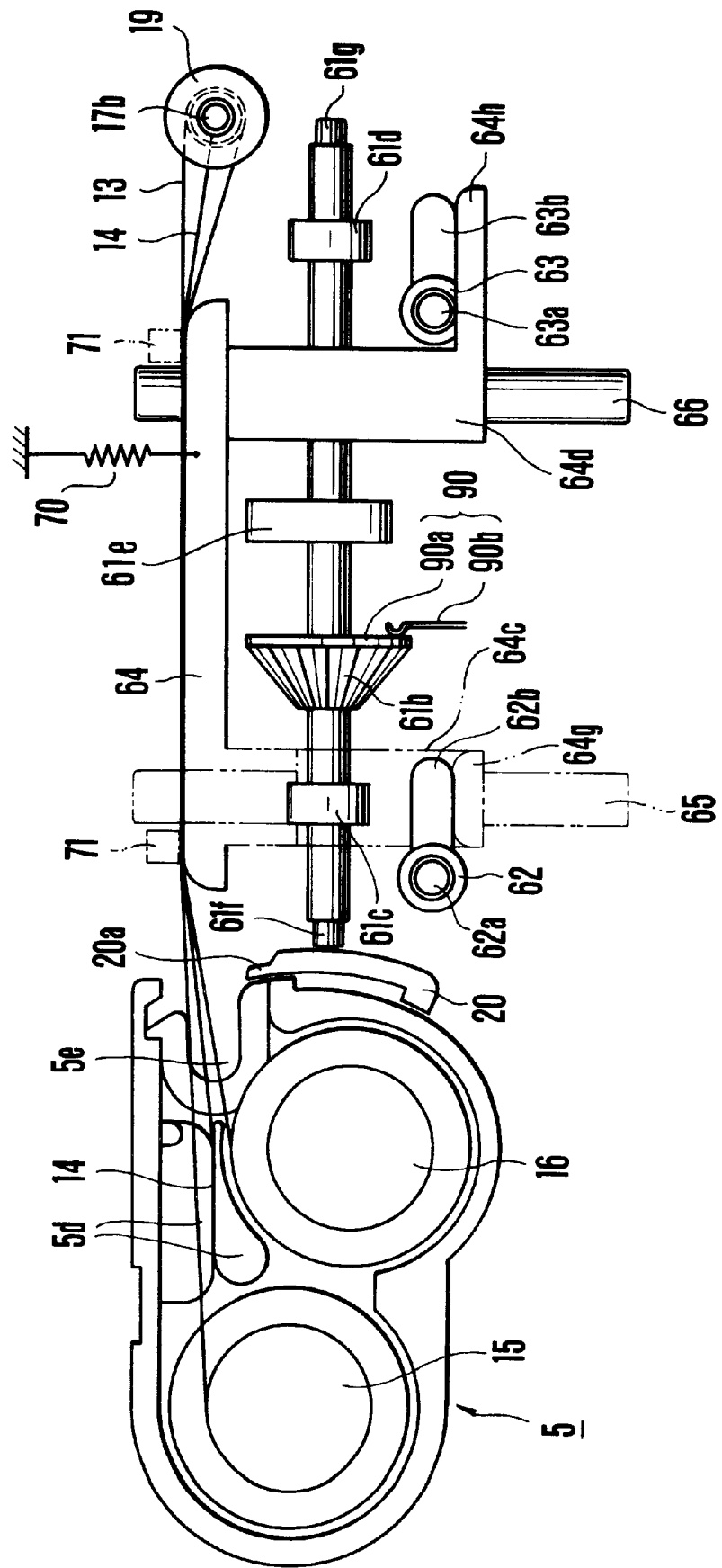

CAMERA SYSTEM

This application is a continuation of application Ser. No. 08/307,488 filed Sept. 16, 1994, which is a continuation of application Ser. No. 07/984,253 filed Dec. 1, 1992, which is a continuation of application Ser. No. 07/666,447 filed Mar. 11, 1991, which is a continuation of application Ser. No. 07/427,693 filed Oct. 27, 1989, all now abandoned.

BACKGROUND OF THE INVENTION

1. Field of the Invention

This invention relates to a novel film cartridge and a camera system comprising a camera capable of using that film cartridge.

2. Description of the Related Art

To the cameras using a silver-halide film, the film cartridges which have already been put into practical use are of the 135 type (for 35 mm wide film), the 110 type, the disk type, etc.

At first, the 135 type has a single shaft within the film cartridge, on which a roll of film is wound as it is stored. When making exposures, the film is pulled out of the cartridge one frame by one frame. On consideration of the format size and the number of frames, the size of the cartridge housing is relatively small. Because the space efficiency is so good, this type has widely been used for the general purposes. But the free end of the film is pulled out from the cartridge to a reasonably long length, before the cartridge is loaded into the camera. Further, it is troublesome to bring the film tongue into connection with the take-up spool at right place. These operations have annoyed the users, particularly the beginner who is not accustomed to cameras. Another drawback is that there is a possibility of failure of the automatic loading by the damage of the perforations of the film due to their wrong engagement with the sprocket of the camera.

Next, in the 110 type, the supply shaft, the take-up shaft and an aperture portion are built in unified form with the cartridge housing, giving rise to an advantage that, even for the beginner, it is easy to load the film into the camera. But, because the film plane cannot be fixed when the exposure is being made, there is a drawback that the focus accuracy is low. Another drawback is that the size of the environment surrounding the aperture portion is limited by the cartridge.

Lastly, the disk type has a simple structure of construction, as it literally suggests, to the disk shape. Since the film is in the form of sheets, the focus accuracy is high. But, because a large plane space is necessary for the format size, there is a large drawback that the camera cannot be constructed in a compact form. Therefore, the use of this type has not been widespread.

SUMMARY OF THE INVENTION

With the foregoing in mind, the present invention has been made and its object is to provide a film cartridge and a camera which can solve the above-described conventional drawbacks.

To achieve such an object, the present invention is to provide a camera system comprising a film cartridge provided with a first shaft around which an unexposed film is wound, a second shaft for taking up an exposed film, and a movable third shaft which causes a portion of the film which has been sent out from the first shaft to be folded back in U-turn way so that the portion of the film is allowed to be taken up around the second shaft, and a camera capable of being loaded with, or accommodating the film cartridge, and provided with moving means for moving, when the film cartridge has been loaded, the third shaft of the film cartridge so as to make an exposure.

Other objects of the invention will become apparent from the following description of embodiments thereof.

BRIEF DESCRIPTION OF THE DRAWINGS

FIG. 3(a) to FIG. 3(g) illustrate in great detail a film cartridge suited to be used in the camera of the invention in different operative positions.

FIG. 4 to FIG. 6 are respectively a perspective view, a top view and a front elevation view of a film loading mechanism.

FIG. 7 and FIGS. 9(a) and 9(b) are a perspective view and top plan views of an aperture retracting mechanism.

DETAILED DESCRIPTION OF THE PREFERRED EMBODIMENT

The present invention is next described in connection with an embodiment thereof by reference to the drawings.

Figure 1A:
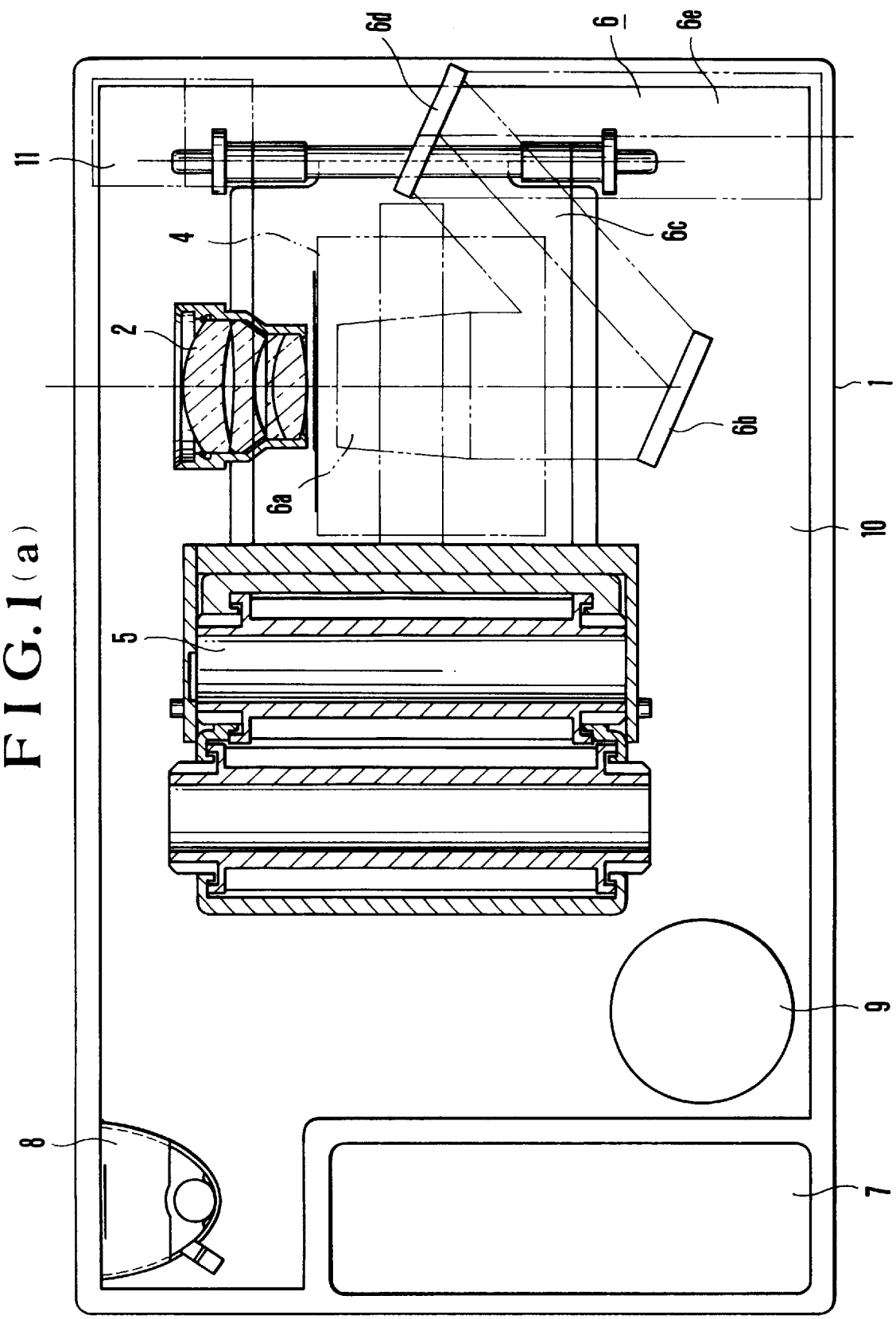
FIG. 1(a) to FIG. 1(c) are three-side views illustrating a typical layout of the camera of the invention.
Figure 1B:
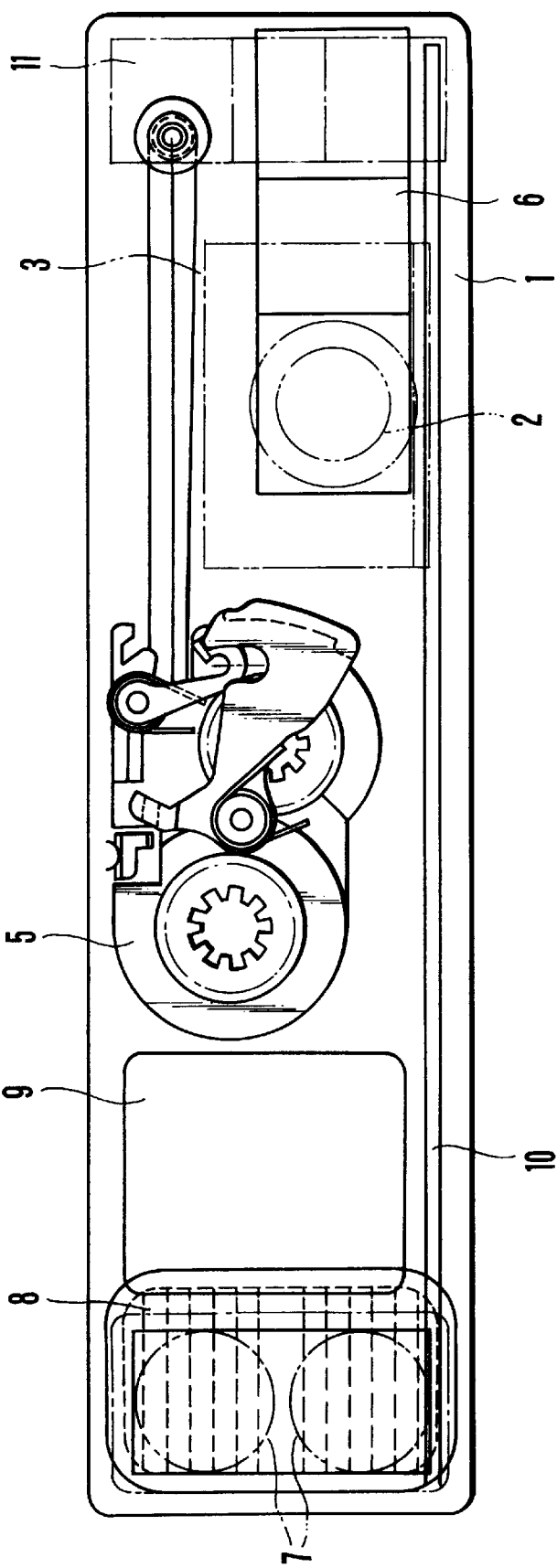
Figure 1C:
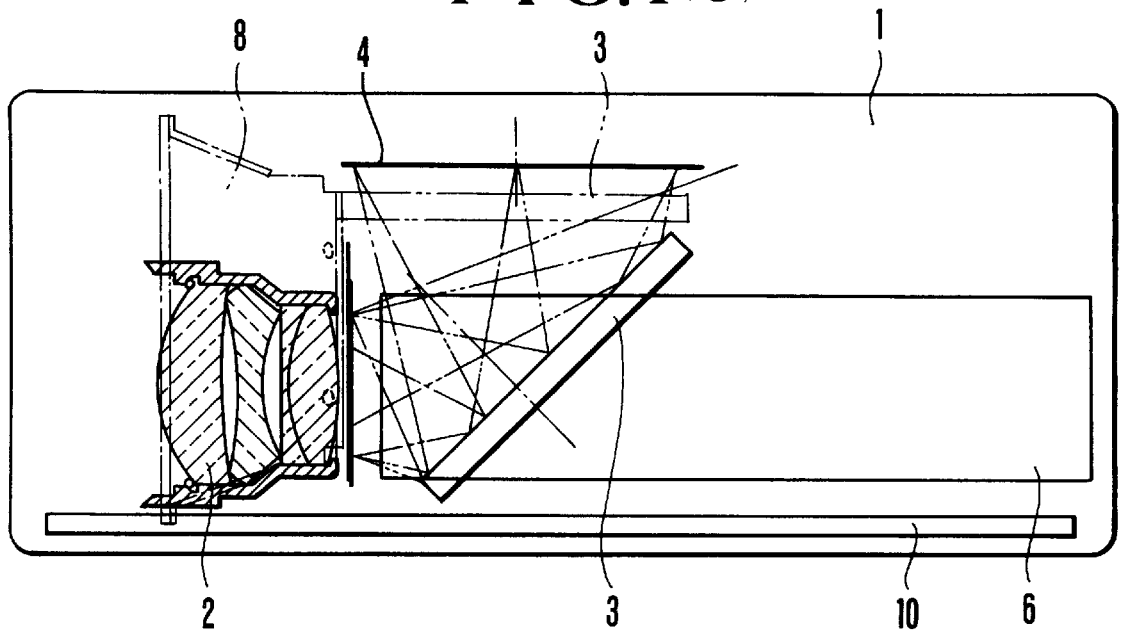
Figure 2:
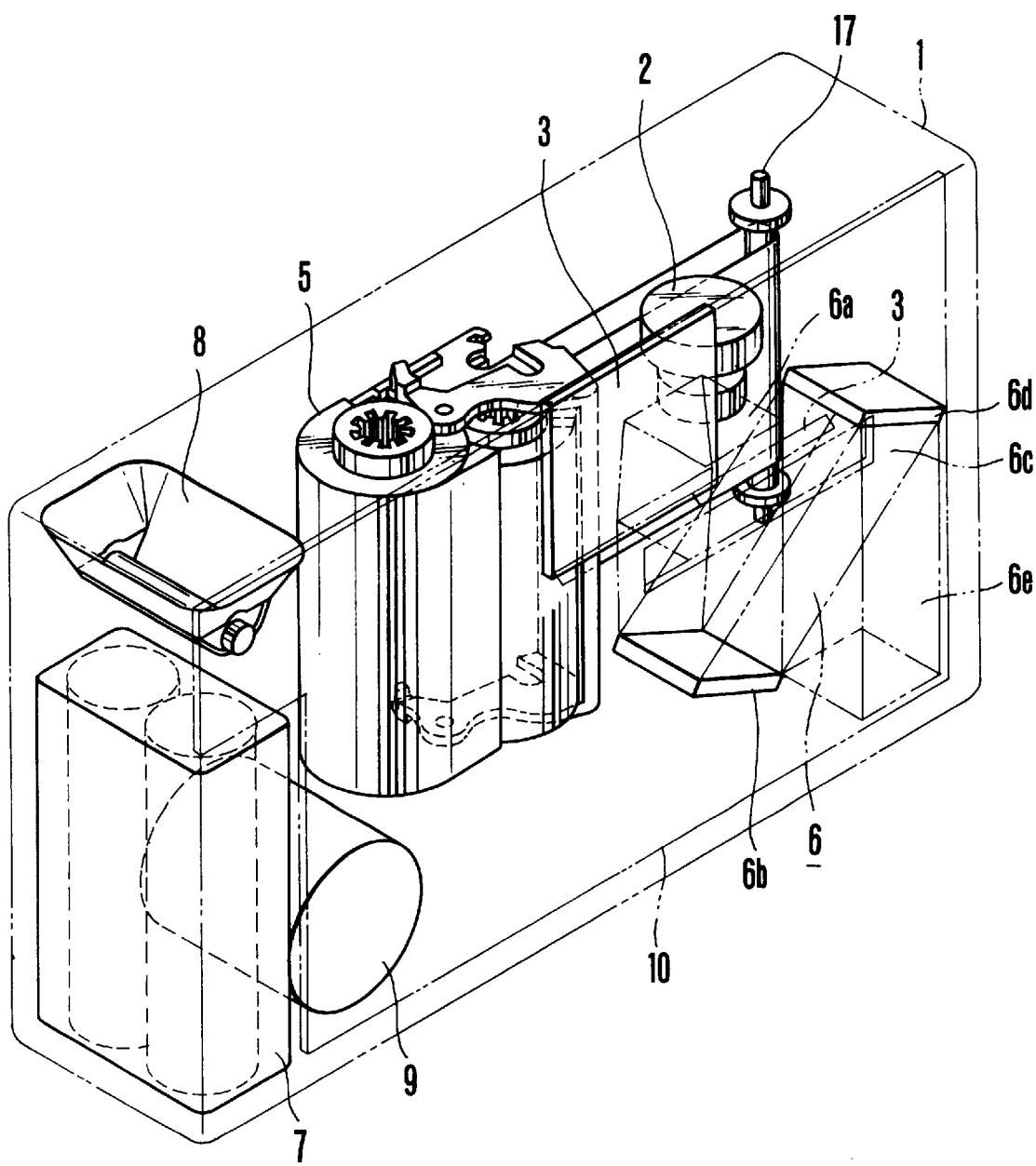
FIG. 2 is a perspective view of the camera of FIG. 1.

FIGS. 1(a), 1(b) and 1(c) and FIG. 2 show the camera of a typical layout according to the invention, FIG. 1(a) showing the layout of the camera as seen from below, FIG. 1(b) showing the layout of the camera as seen from the front, FIG. 1(c) showing the layout of the camera as seen from the side, and FIG. 2 showing the perspective view of the camera shown in FIGS. 1(a) to 1(c).

A camera body 1 contains a photographic lens 2 and a pivotal mirror 3 with a quick return mechanism therefor to be more fully described later. When the mirror 3 is so arranged that, in a position shown by solid lines in FIG. 1(c) and two-dot chain lines in FIG. 2, light passing through the photographic lens 2 is reflected by the mirror 3 and forms an image on an aperture 4, while, in a position shown by two-dot chain lines in FIG. 1(c) and solid lines in FIG. 2, light passing through the photographic lens 2 enters a finder 6 without being acted on by the mirror 3. A film cartridge 5 of a new type will be described in great detail later by reference to FIGS. 3(a) to 3(g). The finder 6 is of the TTL type having a secondary image forming system, and receives light from the photographic lens 2 when the mirror 3 flips up to cover the aperture 4 as shown in FIG. 2. This light passes through a convex lens (not shown) for contracting the image surface positioned adjacent a primary focal plane (not shown) of the finder 6. Light radiating from the primary focal plane is reflected by a mirror 6b to a zoom optical system 6c and therefrom directed by a mirror 6d to a secondary focal plane (not shown) on which an image of an object is formed along with images of a viewfield frame and a distance measuring frame for AF. These images are observed by the photographer looking through an eyepiece lens 6c.

The camera body 1 further contains a battery 7, a flash device 8, a storage capacitor 9, a circuit board 10 and a distance measuring unit 11 for AF. As is apparent from FIG. 1(b) at a glance, the photographic lens 2 and the flash device 8 take their places proximate to the opposite sides in the front panel of the camera housing, contributing to a reduction of the possibility of the red-eye phenomenon which would otherwise occur when a person is photographed in the flash photography mode.

Another advantage arising from the use of such a layout in the camera is that the light entrance and exit windows (for the photographic optical system, the AF, the finder and the flash device) can be concentrated in one of the side walls of low height of the flat rectangular parallelepipedon, thus permitting the top wall of widest area (the rectangular surface shown in FIG. 1(a)) to be used for installing the fabricated circuit board 10 without having to form any cutout therein. Therefore, the fabrication can be done with greatly improved efficiency. Yet another advantage is that even when making cameras by changing the rating of the photographic lens, it is only necessary to alter the neighborhood of the photographic lens 2, leaving all the other portions unchanged in size. This facilitates a common use of the units between these cameras. That is, since, in the prior art, the compact camera using a 35 mm roll film had its photographic lens positioned at almost the central portion intervening between the film cartridge and the take-up spool, if the size and other factors of the photographic lens are altered, the framework, the rewind unit, the finder unit and others would be all changed in dimensions. Hence, it is almost impossible to employ common units in the different cameras.

Figure 3A:
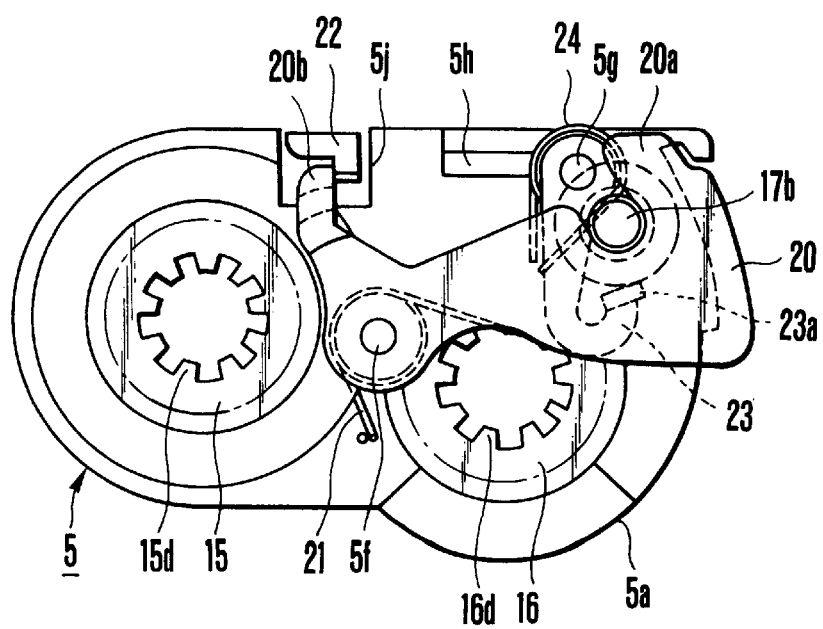
Figure 3B:
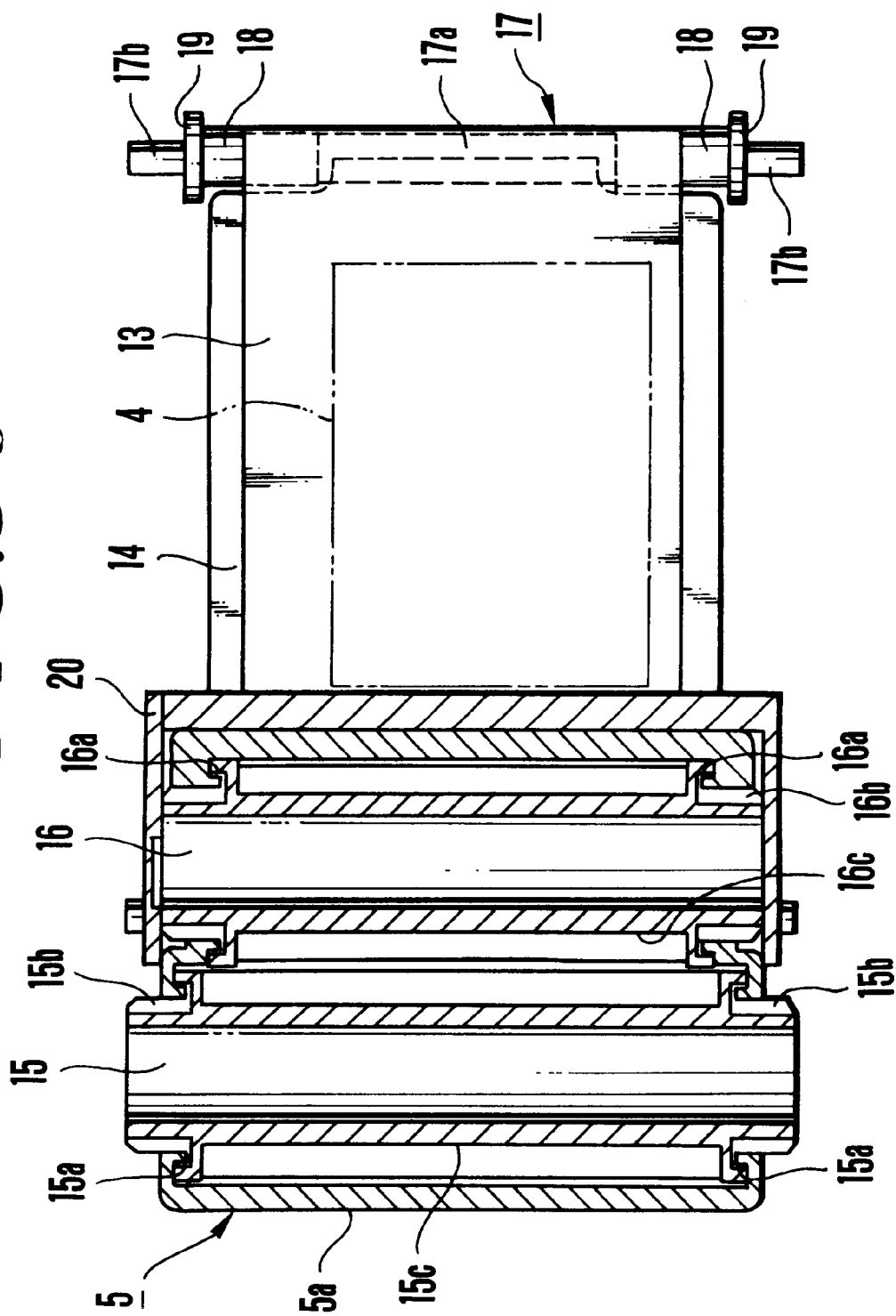
Figure 3C:
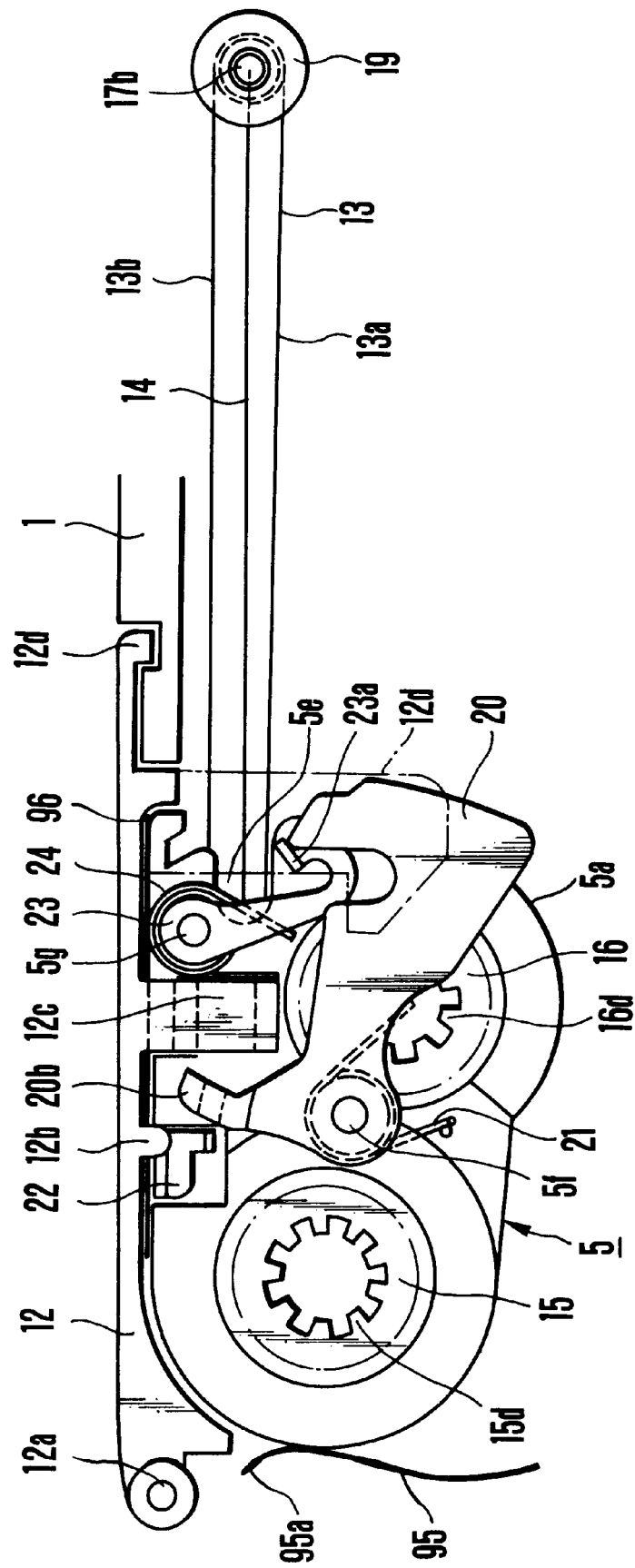
Figure 3F:
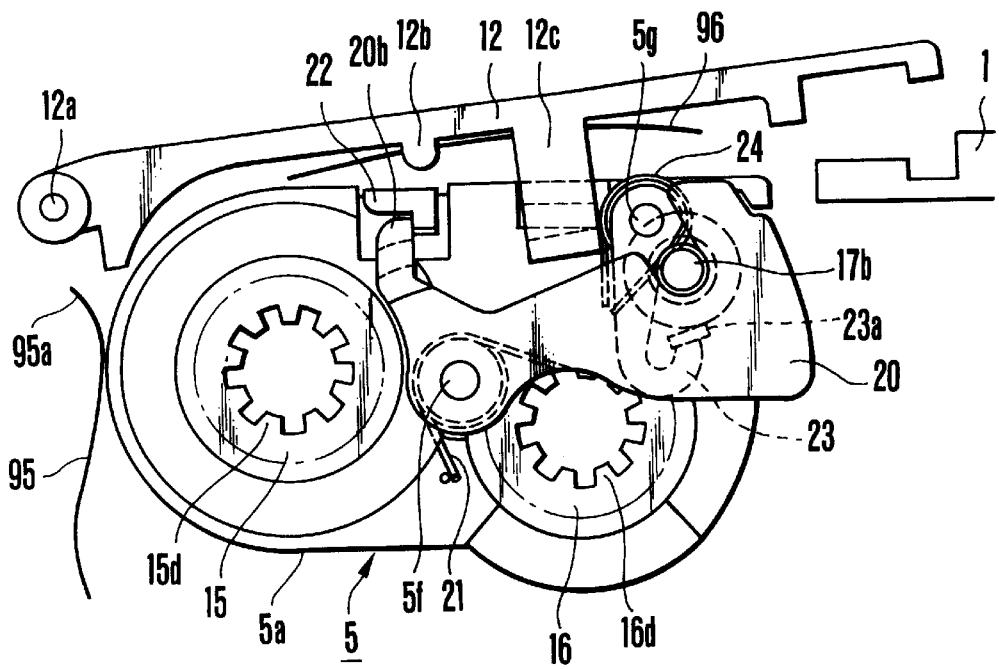
Figure 3G:
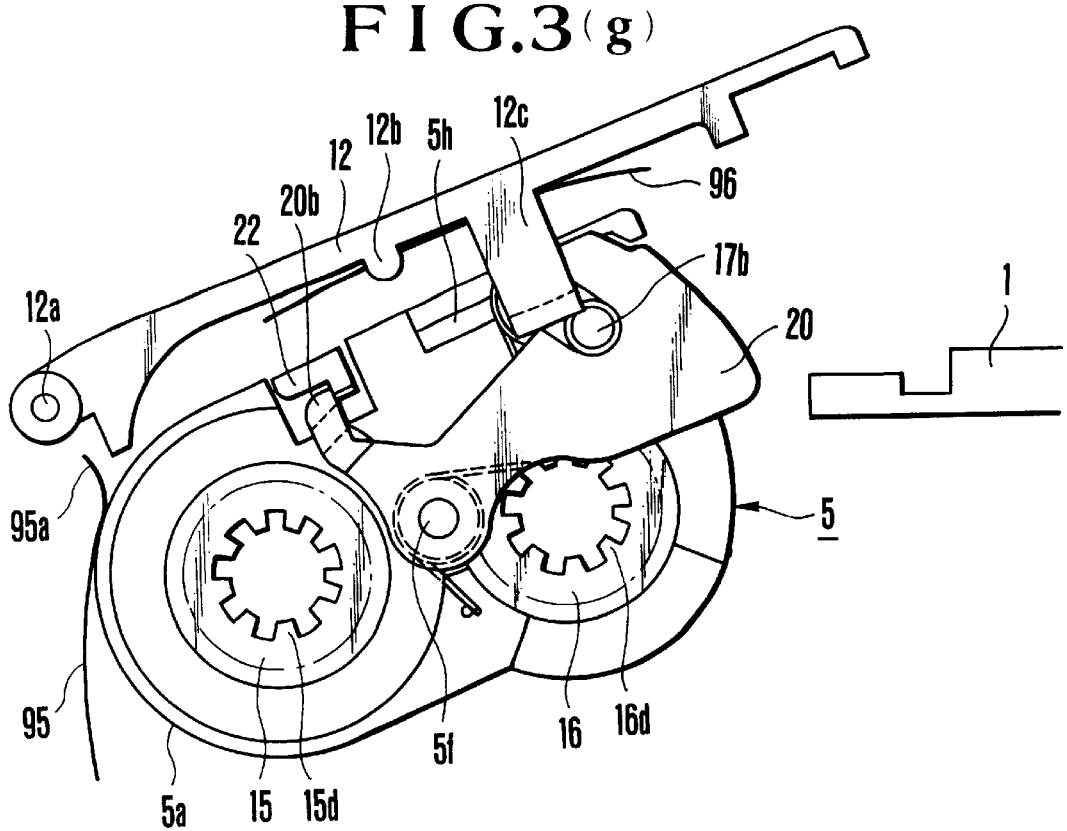

FIGS. 3(a) to 3(b) show the details of the film cartridge 5 according to the invention with FIG. 3(a) in a stored position of the film in the cartridge as seen from above, FIG. 3(c) in a fed position of the film (or the ready-to-expose position) in the cartridge as seen from above, and FIG. 3(b) being the side elevation view of the film in the position of FIG. 3(c). The cartridge 5 has a body 5a in which are mounted a take-up shaft 15 around which the fed portion of film 13 and a light-shielding sheet 14 are to be taken up, and a supply shaft 16 around which the unexposed portion of the film 13 is previously wound. As shown in FIG. 3(b), the take-up shaft 15 and the supply shaft 16 are rotatably supported with their flanged portions in fitted recesses 15a and 16a respectively, and fixedly carry gears 15b and 16b or toothed portions 15d and 16d upon connection to a drive unit of the camera to wind the film 13 around drums 15c and 16c respectively. The film 13 is connected at one end to the core of the shaft 16 by commonly known means, and wound around the periphery of the shaft 16, the other end of which, after having been turned around a roller 18 to be described later, is connected to the core of the take-up shaft 15 around which the fed portion of the film 13 is wound.

The light-shielding sheet 14 is fixed at one end to a movable shaft 17 to be described later and takes its position between the two folded film portions 13a and 13b as the film 13 U-turns around the aforesaid roller 18. As shown in FIG. 3(b), it has a shape of slightly wider width than that of the film 13. Its other end, in the film stored position shown in FIG. 3(a), is brought along with the film 13 to the take-up shaft 15. Its longitudinal length is so determined that in the position shown in FIG. 3(c), the other end lies between a pair of guide portions 5d shown in FIG. 9(a), not coming into contact with the take-up shaft 15 and the film wound therearound. The light-shielding sheet 14 plays a role such that when an exposure is made with the film cartridge 5 loaded in the camera, light leaking past a film frame 13a under exposure is prevented from reaching the already exposed film frame 13b.

The movable shaft 17, when the fed portion of the film is fully taken up, lies close to the mouth 5e of the film cartridge body 5a and has a role of guiding the film 13 as is pulled out of the mouth 5e while turning around it. As has been described before, it trails the light-shielding sheet 14 by one boarder thereof, and rotatably carries the roller 18 between a pair of retainer rings 19 therefor fixedly mounted thereon, which also serve to prevent the taken-up film from fogging. Two guide pins 17b are fixedly mounted on either end of the shaft 17 and operatively connected to a drive portion of a loading mechanism to be more fully described later.

A cartridge shutter 20 is rotatably mounted about pivot pins 5f extending outwardly of the upper and lower surfaces of the cartridge body 5a, and is urged by a spring 21 always in a counterclockwise direction as viewed in FIG. 3(a) until a shutter portion 20a stops with its free end in an abutting position shown in FIG. 3(a) against a light-shielding groove of the cartridge body 5a, thus covering the mouth 5e of the film cartridge 5 for shielding light. The cartridge shutter 20 has its other end formed to an engagement portion 20b and is so arranged that in the position of FIG. 3(a), the engagement portion 20b rests on a lock pawl 22 in a spot facing portion 5j of the cartridge body 5a so that even if the cartridge shutter 20 is given a shock in the clockwise direction, it does not turn. Yet, when a back cover 12 is being closed, a protuberance 12b pushes the lock pawl 22 to disengage from the engagement portion 20b. Thus, the cartridge shutter 20 is biased only by the spring 21 in the counterclockwise direction. Because the back cover 12 has a control knob (not shown) therefor to work at the time of full closure of the back cover 12, the cartridge shutter 20 is turned to the position shown in FIG. 3(c) by the returning power of the control knob.

A memory lever 23 is rotatably supported about a pivot pin 5g of the film cartridge body 5a and is urged by a spring 24 in a counterclockwise direction of FIG. 3(a). When in the position shown in FIG. 3(c), it abuts on a stopper (not shown) of the cartridge body 5a, staying in such an attitude shown in the figure that an extension 23a of the memory lever 23 arrests the cartridge shutter 20 in the open position. Thus, the cartridge shutter 20 is not aimlessly closed under the condition that the film 13 is going out. As the movable shaft 17 returns from the position of FIG. 17 by the loading mechanism, when it nears the terminal end of movement, the memory lever 23 starts to be turned by the pressure of the pushing movable shaft 17 in the clockwise direction to the position of FIG. 3(a). At the same time, the extension 23a moves away from a free end 20a of the cartridge shutter 20. After this, the bias force of the spring 21 acts on the cartridge shutter 20 to turn in the counterclockwise direction to the fully closed position of FIG. 3(a).

The back cover 12 is rotatably supported about a shaft 12a on the camera body 1 and has the aforesaid protuberance 12b for actuating the lock pawl 22 of the film cartridge 5, a hook portion 12c and a lock portion 12d for engagement in a recess of an opening and closing knob (not shown) for the back cover 12. Here, the hook portion 12c is arranged such that when the back cover 12 is being closed, it sways at its arm like a leaf spring and, when fully closed, confronts a a projected portion 5h of the cartridge body 5a by a space of predetermined length δ. So it plays a role of pulling the film cartridge 5 out of the camera body 1 by snatching the projected portion 5h of the cartridge body 5a, when the back cover 12 is opened.

In FIG. 3(c), a cartridge presser leaf spring 95 is fixedly mounted at it one end to the right side of the camera body 1, and can resiliently deform to the right direction as viewed in that figure. Its free end is formed to a bent-off portion 95a to facilitate insertion of the film cartridge 5 from above. Another presser leaf spring 96 is mounted on the inside of the back cover 12. This spring 96 also serves to urge the back cover 12 to turn in the opening direction. Such cartridge presser spring 95 and back cover spring 96, when resiliently deformed, react to steadily hold the loaded film cartridge 5 in the camera body 1 against shaking.

Figure 5:
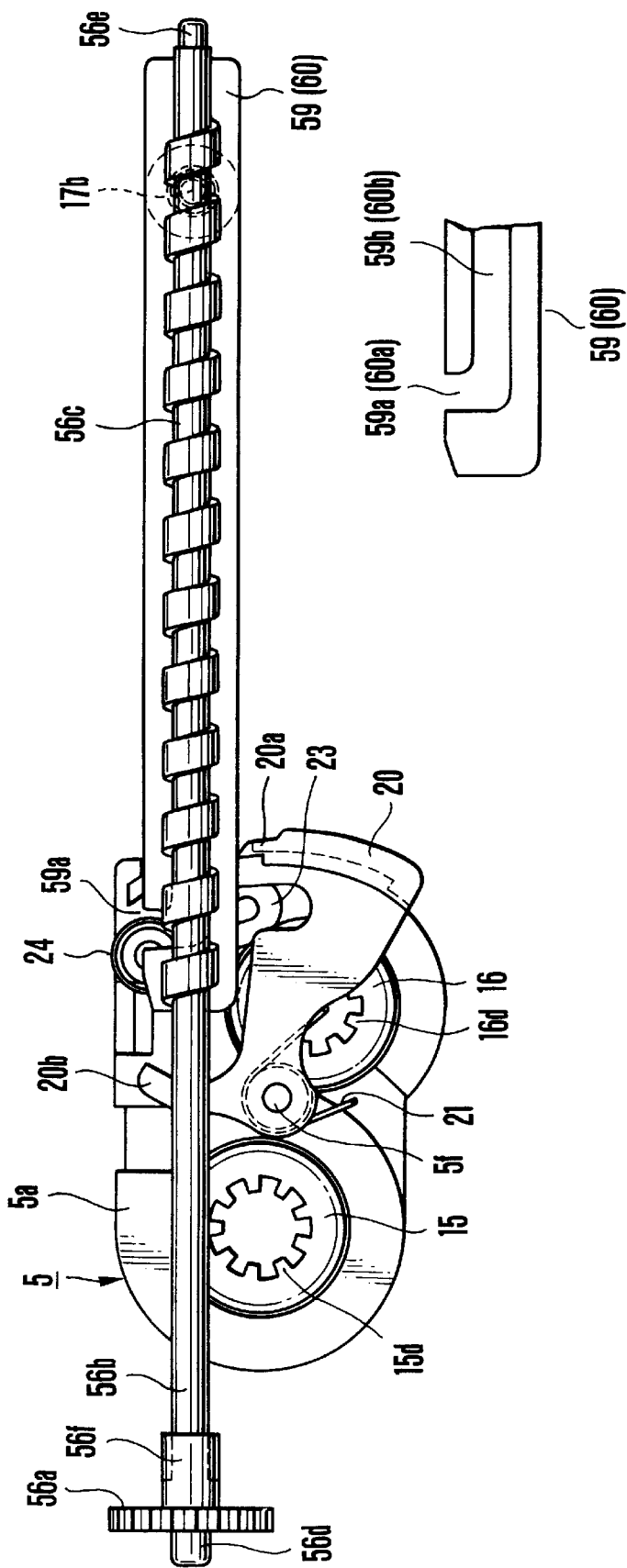
Figure 6:
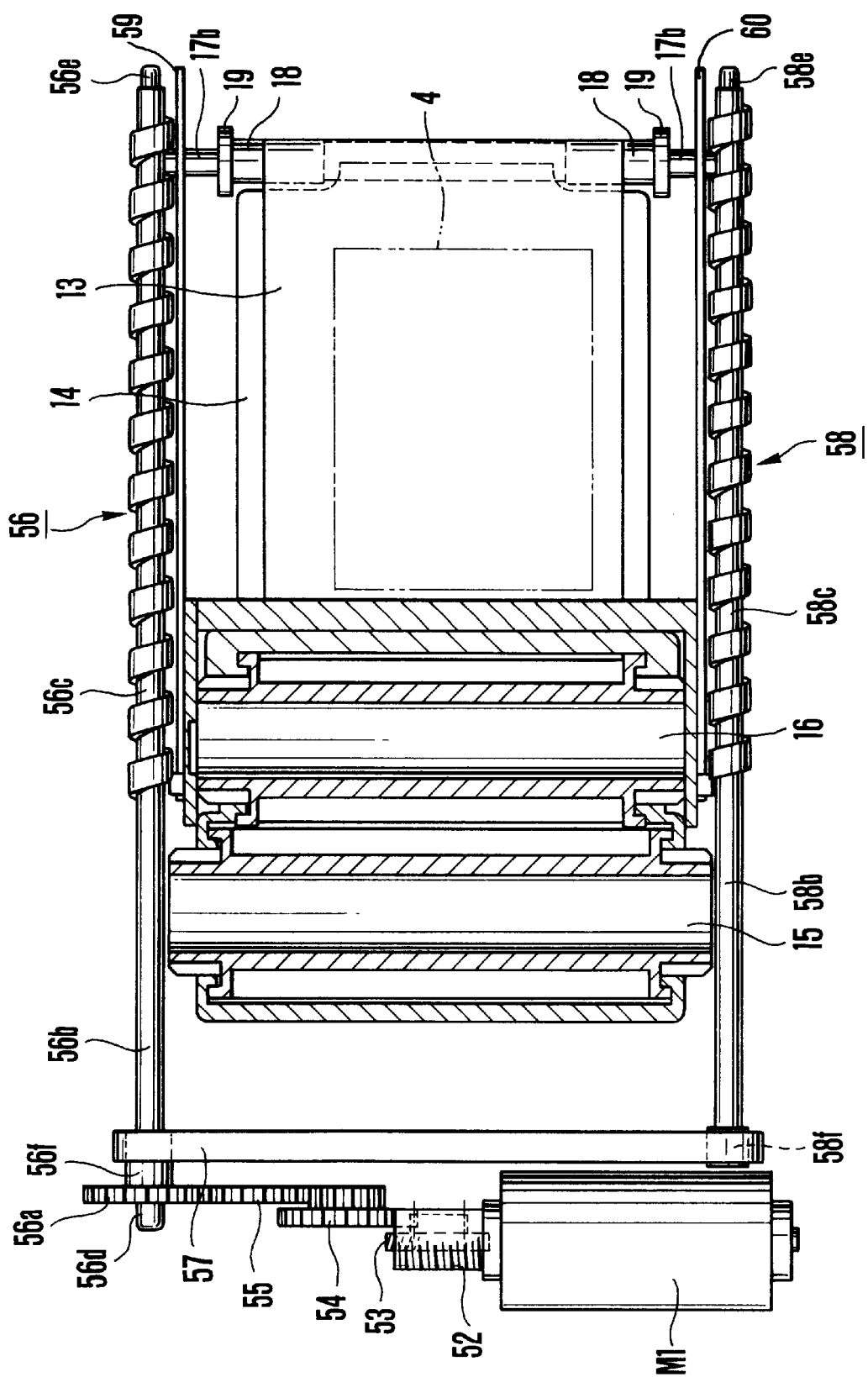

The construction and arrangement of the elements of a mechanism for loading the film is described by using the perspective view of FIG. 4, the top plan view of FIG. 5, and the front elevation view of FIG. 6.

An electric motor M1 is used for loading the film 13 to a position where a frame is photographed, and, after all frames have been exposed, or if the user wants to take the film cartridge 5 out of the camera at a middle course of filming, for putting the movable shaft 17 into the interior of the cartridge body 5a. As it rotates in the clockwise direction, the loading of the film 13 is performed. By the counter-clockwise rotation, the housing is performed. A worm gear 52 is fixedly fitted on the output shaft of the motor M1. Gears 53, 54 and 55 constitute a speed reduction train. A first feed screw 56 has a gear portion 56a at one end thereof, and has a shaft portion 56b through which a circumambient lead groove 56c is formed. The guide pin 17b of the movable shaft 17 in the film cartridge 5 engages in this groove 56c. Further, both end portions 56d and 56e of the first feed screw 56 are mounted on journal bearings in proper places of the camera body. Also, a large diameter portion 56f at the side of the gear portion 56a of the shaft portion 56b is provided with a circumambient sheave groove in which a belt 57, for example, having rack teeth for torque transmission, is snugly fitted. A second feed screw 58 is similar in construction to the first feed screw 56 except for the lack of a corresponding portion to the gear portion 56a. With appendant use of the same subscripts, therefore, their explanation is omitted. In the assembled state onto the camera body, the first feed screw 56 and the second feed screw 58 are adjusted so that the phases of rotation of the lead grooves 56c and 58c differ 180° from each other, so that the belt 57 is put into tension around them. A first guide plate 59 and a second guide plate 60 have U-cut portions 59a and 60a through which the guide pins 17b of the movable shaft 17 in the cartridge body 5a, when being loaded, enter respective guide slots 59b and 60b at one ends contiguous thereto, as shown in FIG. 5. These guide plates 59 and 60 are juxtaposed respectively on the inner sides of the first feed screw 56 and the second feed screw 58 and fixedly mounted in the camera body 1 in such a way that the axes of the first feed screw 56 and the second feed screw 58 and the central lines of the guide slots 59b and 60b of the first guide plate 59 and the second guide plate 60 lie in a common plane.

Figure 7:
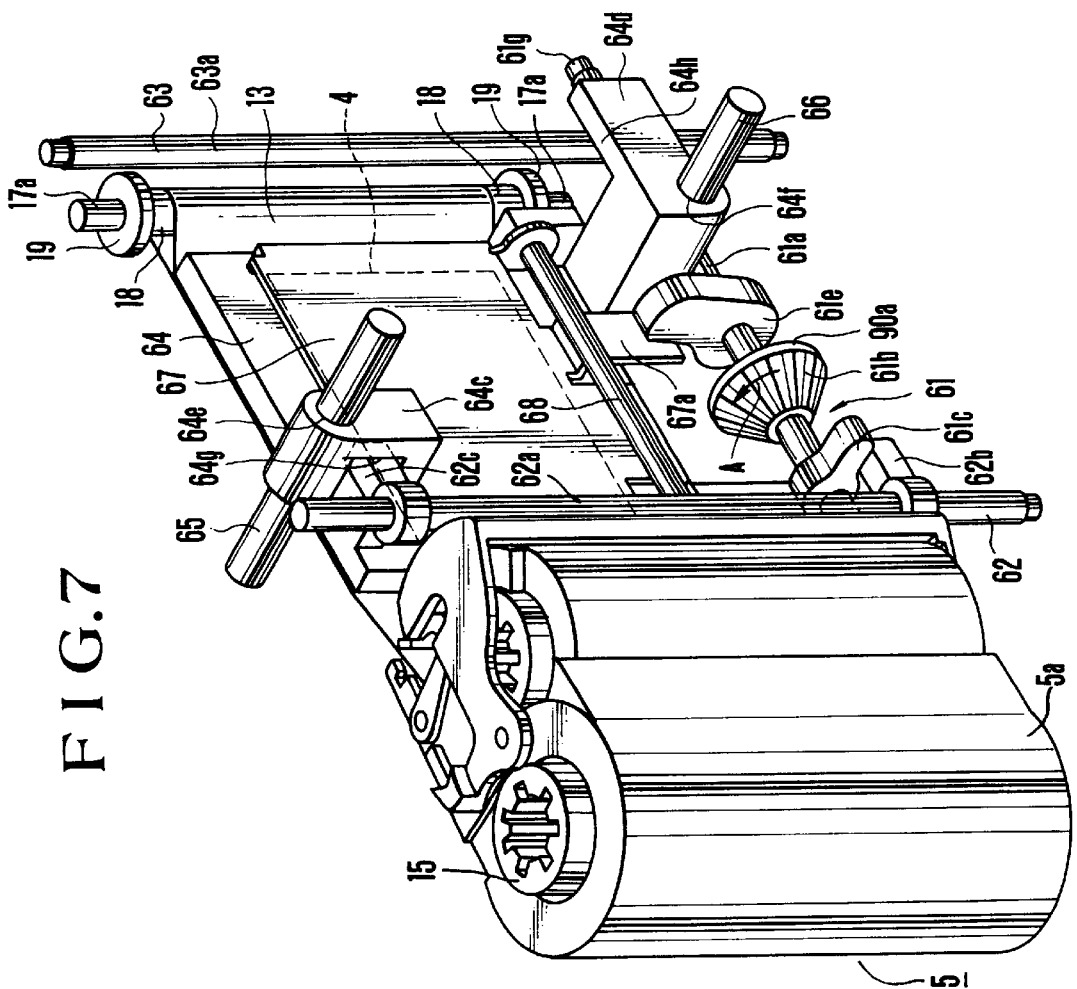
Figure 9A:
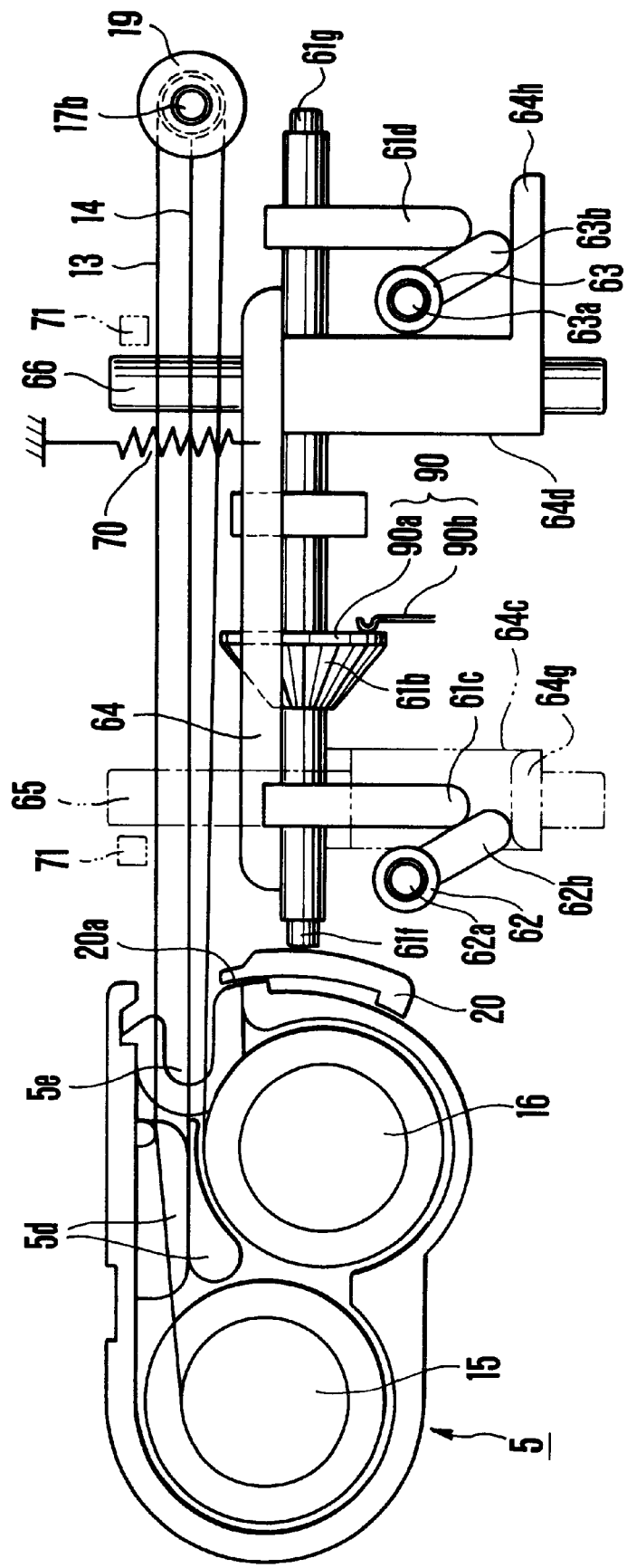
Figure 10A:
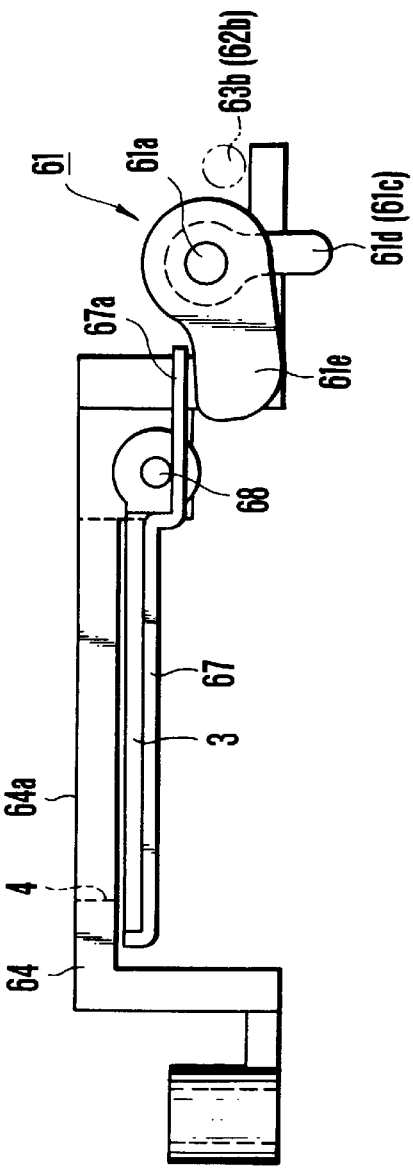
FIGS. 10(a) and 10(b) are side elevation views of a mirror drive mechanism in different operative positions.
Figure 10B:
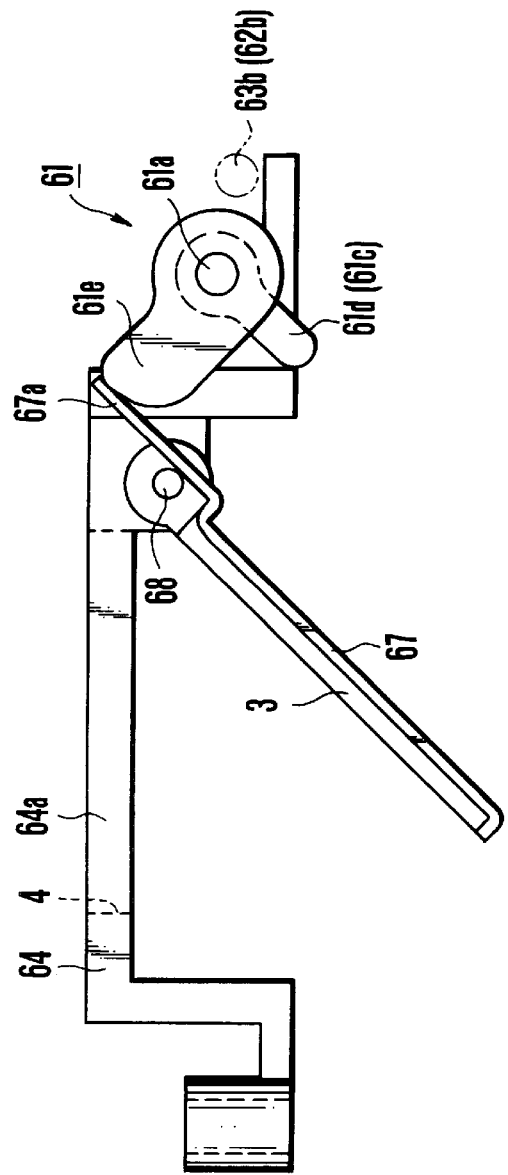

Next, the constituent elements of a movable type of aperture with an operating mechanism therefor are described with reference to the perspective view of FIG. 7, the top plan views of FIG. 8 and FIGS. 9(a) and 9(b) and the side elevation views of FIGS. 10(a) and 10(b). A drive cam 61 has its shaft 61a fixedly carrying a bevel gear portion 61b to which the power of a motor M2 (FIG. 8) is transmitted through a gear train to be described later and is rotated in a direction of arrow A in FIG. 7. First and second reversion cam portions 61c and 61d of the same form (FIG. 9) transmit the power to a first operating lever 62 and a second operating lever 63 respectively and change their direction of rotation.

A mirror drive cam portion 61e, when making an exposure, sets the aforesaid mirror 3 to an 45° inclination so that the axial beam of the photographic lens is bent 90° to the film 13. For this purpose, its phase of rotation about the axis of the shaft 61a is adjusted to 90° relative to that of rotation of the first and second reversion cam portions 61c and 61d. The first and second operating levers 62 and 63 turn in a clockwise direction in FIG. 9(a), as the first and second reversion cam portions 61c and 61d of the drive cam 61 rotate in the direction of arrow A. The first operating lever 62 has a first lever portion 62b on which the first reversion cam portion 61c of the drive cam 61 abuts. A second lever portion 62c of the same form as that of the first one is mounted on a common shaft 62a at the opposite location to the first lever portion 62b across the film 13 in the same phase and has a role of moving an aperture frame 64 to be described later in the direction perpendicular to the film plane. A second operating lever 63 has only one lever portion 63b on which the second reversion cam portion 61d of the drive cam 61 abuts. In cooperation with the lever portion 62c of the first operating lever 62, this also plays a role of moving the aperture frame 64 on the opposite side where the second cam portion 61d works, thus assuring a good stability of operation of the aperture frame 64. The operating levers 62 and 63 each are rotatably supported at both ends of each of the shafts 62a and 63a on the camera body 1 and a base plate (not shown) or the like respectively.

The aperture frame 64 has an aperture plane 64a (FIG. 10) with an opening portion (aperture) 4 bored therein to a size corresponding to the format for the film 13. This surface 64a functions as a presser for the film 13. On the opposite side of the aperture frame 64 to the aperture plane 64a there are provided projection portions 64c and 64d (FIG. 7) respectively above and below the opening portion 4. The projection portions 64c and 64d are provided with holes 64e and 64f for shafts 65 and 66 penetrated up to the aperture plane 64a in such positions that the shafts 65 and 66 fitted in the holes 64e and 64f clear the path of movement of the film 13. The shafts 65 and 66 are fixedly supported on the camera body and the base plate. Again, as shown in FIG. 9(a), the projection portions 64c and 64d are further provided respectively with walls 64g and 64h. These walls 64g and 64h react to the abutting engagement of the second lever portion 62c of the first operating lever 62 and the lever portion 63b of the second operating lever 63, causing the aperture frame 64 to move away from the film plane in the perpendicular direction against the bias force of a spring 70 (FIG. 9(a)), while the projection portions 64c and 64d simultaneously sliding on the shafts 65 and 66. This spring 70 is trained between the aperture frame 64 and the camera body or the base plate, so that after the film 13 is fed and set in registry with the opening portion 4, the aperture frame 64 is pressed against stoppers 71 by the urging force of the spring 70. Thereby, the film 13 is brought into pressure contact with the aperture plane 64a of the aperture frame 64 to make out flatness, and, at the same time, its axial position is defined by the stoppers 71. Thus, a plane of sharp focus for the photographic lens 2 can precisely be made out.

The mirror 3 in a support bracket 67 is rotatably mounted about a shaft 68 on the aperture frame 64. At all times except for making an exposure, the mirror 3 is pushed on the surface opposite to the aperture plane 64a of the aperture frame 64. As a camera release is actuated, the drive cam 61 starts rotating. The mirror drive cam portion 61e then engages on an arm portion 67a of the mirror support bracket 67, and turns 45° the mirror support bracket 67 about the shaft 68. Then, the axial beam passing through the photographic lens 2 is 90° reflected by the mirror 3 and impinges on the film 13 at right angles, when it is exposed. It should be noted in this connection that the drive cam 61 is braked and stopped from rotation by detecting its absolute position with the use of an encoder 90 comprising a Gray code plate 90a and a slider 90b as shown in FIG. 8. With this, a faulty operation has, despite somewhat of a difference of its stopped position from the prescribed one, is prevented from occurring. To this purpose, that protuberance of the mirror drive cam portion 61e of the drive cam 61 which is able to come into contact with the arm portion 67a of the mirror support bracket 67 is formed to an arcuate shape with its center at the axis of the shaft portion 61a. The use of this feature in combination with a presser or spring (not shown) for pressing the mirror support bracket 67 against the cam portion 61e assures that the angle of 45° can be sustained with high accuracy.

Figure 8:
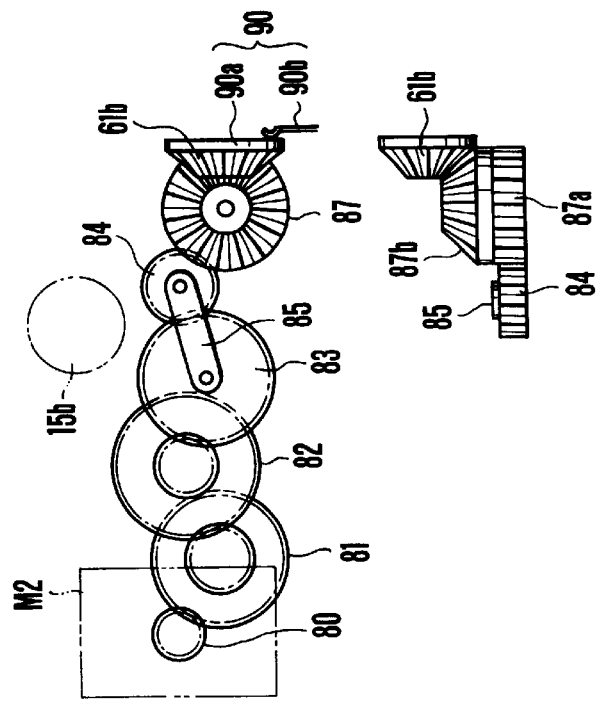
FIG.8 is a top plan view of a power transmitting mechanism.

FIG. 8 is a top plan view of a driving power transmission for use in retracting the aperture frame 64, moving the mirror 3 down and feeding the film. A pinion 80 on the output shaft of an electric motor M2 meshes with a speed reduction train of gears 81 and 82 which meshes with a sun gear 83. The sun gear 83 is connected to a planet gear 84 by a linkage plate 85 through a friction mechanism (not shown) known to those skilled in the art. A 2-stage gear 87 has a spur gear portion 87a and a bevel gear portion 87b. The bevel gear portion 87b meshes with the bevel gear portion 61b of the drive cam 61. With this, when the motor M2 rotates in the forward direction, its motion is transmitted from the pinion 80 through the speed reduction gears 81 and 82 to rotate the sun gear 83 in the clockwise direction. On reaction to this, the linkage plate 85 revolves the planet gear 84 to the right until the planet gear 84 engages the spur gear portion 87a of the 2-stage gear 87. The motion is then transmitted from the bevel gear portion 87b to the bevel gear portion 61b of the drive cam 61 in the crossed form at right angles of their axes of rotation. Hence, the drive cam 61 is rotated in the direction of arrow A (FIG. 7). When the motor M2 rotates in the reverse direction, on the other hand, because the sun gear 83 rotates in the counterclockwise direction, the planet gear 84 linked to the sun gear 83 through the linkage plate 85, while rotating in the clockwise direction, revolves in the counterclockwise direction, until it engages the gear 15b of the film take-up shaft 15. After that, it rotates the film take-up shaft 15 in the counterclockwise direction. Thus, the exposed frames of the film 13 are successively wound up to form a convolution of film around the drum 15c of the film take-up shaft 15.

Figure 14:
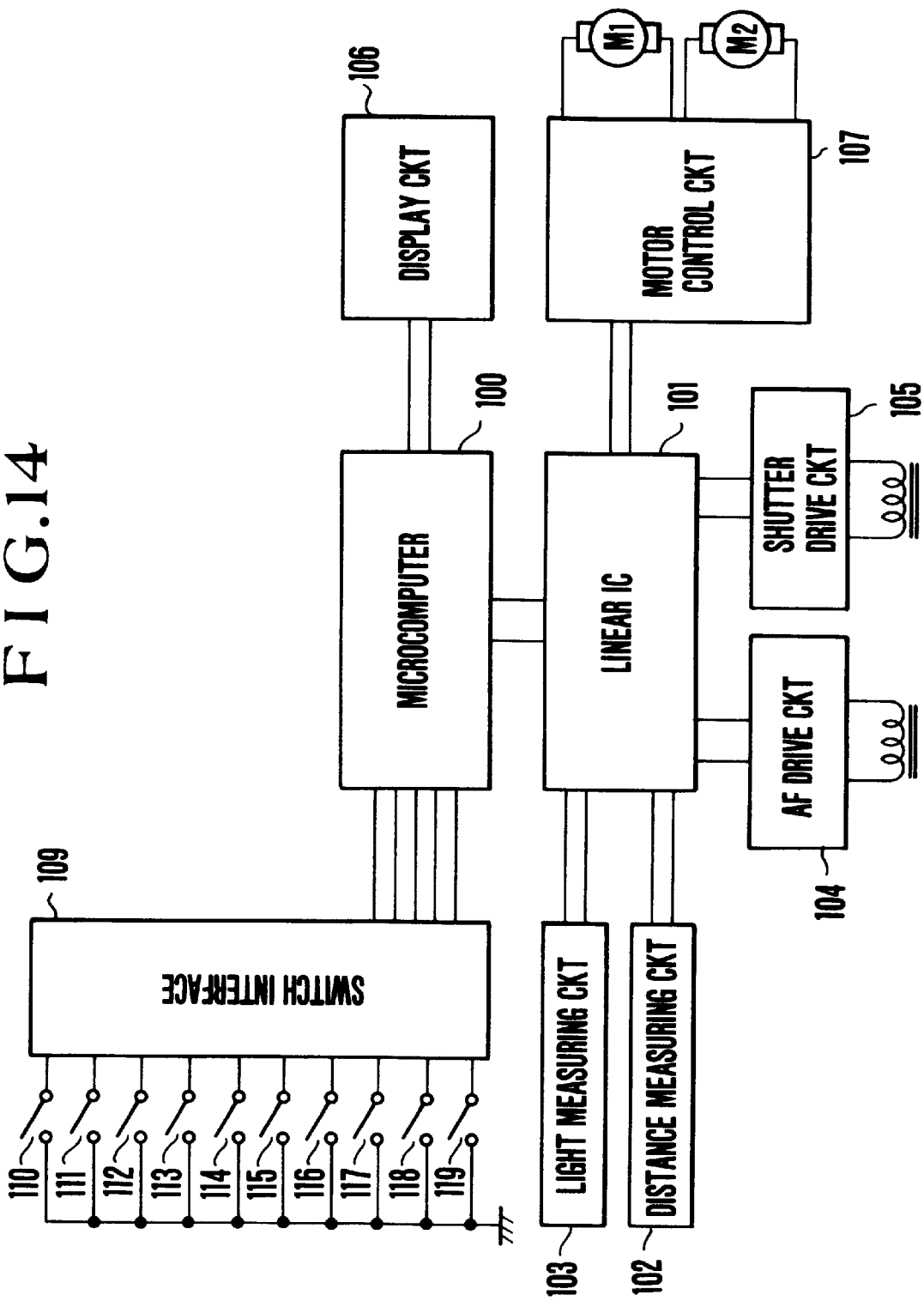
FIG. 14 is a block diagram of the circuitry of the camera of the invention.

FIG. 14 shows the construction of a circuit of the present embodiment. In FIG. 14, a microcomputer 100 controls the various portions of the circuit. A linear IC 101 known to those skilled in the art performs conversion between the digital signals and the analog signals. Reference numerals 102 and 103 denote a distance measuring circuit and a light measuring circuit known to those skilled in the art. An AF drive circuit 104 known to those skilled in the art drives the photographic lens on the basis of the output of the distance measuring circuit 102. A shutter drive circuit 105 known to those skilled in the art is used for performing an exposure operation on the basis of the output of the light measuring circuit 103. A display circuit 106 presents various displays to be described later. A motor control circuit 107 controls the driving of the above-described motors M1 and M2. A switch interface 109 is used for transmitting each state of any of the switches 110 to 119 to the microcomputer 100.

Figure 11:
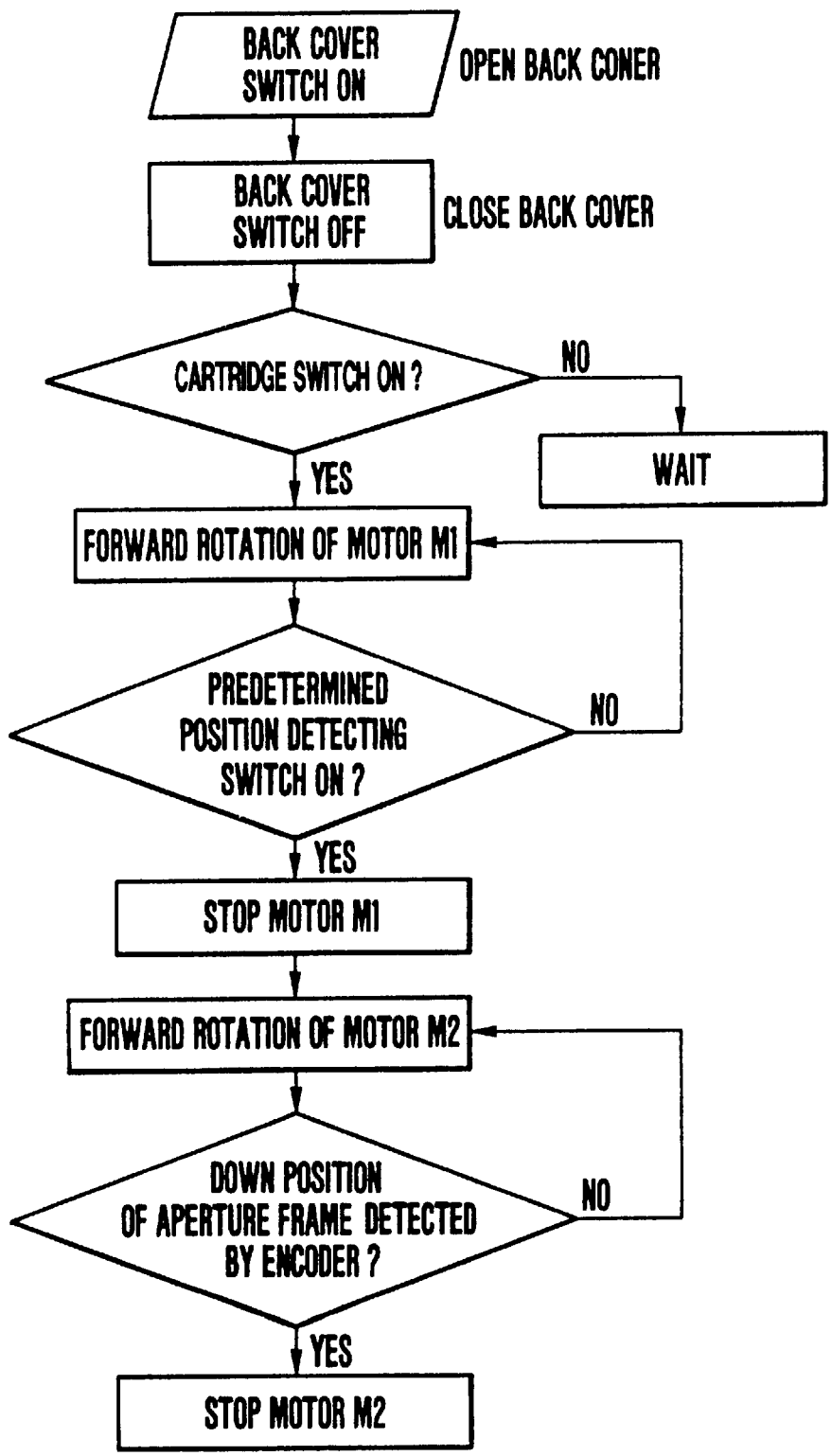
FIG. 11 to FIG. 13 are flowcharts for the loading operation, the photographing operation and the film taking-up operation respectively.

The operation of the present embodiment comprised of such constituent parts is described along with an electric circuit of FIG. 14. To begin with, a loading operation is described by reference to a flowchart of FIG. 11

At first, the back cover 12 of the camera is opened, thereby turning on a normally-open switch 110. When the film cartridge 5 is inserted into and seated in the chamber within the camera body 1, the guide pins 17b of the movable shaft 17 in the film cartridge 5 lie respectively in the U-cut portions 59a and 60a of the first guide plate 59 and the second guide plate 60.

When the back cover 12 is being closed , its closing operation brings the protuberance 12b of the back cover 12 to come into pressure contact with the latch pawl 22 of the film cartridge 5, thereby taking the cartridge shutter 20 off the latching connection. After that, as the back cover 12 is fully closed, a back cover knob (not shown) returns, causing the shutter 20 of the film cartridge 5 to turn in the clockwise direction against the bias force of the spring 21. The shutter 20 is then latched by the memory lever 23 and kept in the full open position as shown in FIG. 3(c). When the back cover is closed, on the other hand, a cartridge sensing switch 111 turns on and the back cover sensing switch 110 turns off, thus starting current supply to the motor M1. As the motor M1 rotates in the forward direction, its motion is transmitted through the worm gear 52 and the gear 53 to the train of the gears 54 and 55 by which the speed is reduced at a predetermined gear ratio, and therefrom to the gear portion 56a of the first feed screw 56, rotating the first feed screw 56 in the counterclockwise direction. Since the belt 57 is fitted in the sheave grooves in the large diameter portion 56f of the shaft 56 of the first feed screw 56 and the large diameter portion 58f of the shaft 58b of the second feed screw 58, the rotative motion of the first feed screw 56 is transmitted to the second feed screw 58 without changing the phase difference of 180° between the first feed screw 56 and the second feed screw 58.

If, at this time, the guide pins 17b of the movable shaft 17 in the film cartridge 5 have already set in the lead groove 56c of the first feed screw 56 and the lead groove 58c of the second feed screw 58, nothing occurs before the movable shaft 17 starts moving toward a predetermined terminal position as is pushed by the lead grooves 56c and 58c as the first feed screw 56 and the second feed screw 58 rotate in the counterclockwise direction so that the film 13 and the light-shielding sheet 14 are moved to the exposure position. If the guide pins 17b of the movable shaft 17 are not yet fitted in the lead grooves 56c and 58c, because the back cover spring 96 fixed to the back cover 12 urges the film cartridge 5 toward the first feed screw 56 and the second feed screw 58, the guide pins 17b, without failure, take the form of being pressed against the edges of the flanges of the lead grooves 56c and 58c. Under this condition, counterclockwise rotation of the first feed screw 56 and the second feed screw 58 causes the guide pins 17b to eventually enter the grooves 56c and 58c. After that, the movable shaft 17 moves toward the predetermined position, as is driven in a similar way to that described above.

When the movable shaft 17 arrives at the predetermined position, the switch 112 turns on. Responsive to this signal past the switch interface 109, the microcomputer 100 and the linear IC 101, the motor control circuit 107 stops the motor M1. After the motor M1 has stopped, the motor control circuit 107 starts to rotate the motor M2 in the forward direction. Up to this time, the aperture frame 64 is held in the retracted position against the bias force of the spring 70 by the clockwise rotation of the first operating lever 62 and the second operating lever 63. As the motor M2 rotates in the forward direction, its motion is transmitted through the pinion 80 and the gears 81 and 82 to rotate the sun gear 83 in the clockwise direction. Responsive to this, the planet gear 84, while rotating in the counterclockwise direction, revolves around the shaft of the sun gear 83 in the clockwise direction and engages the spur gear portion 87*a* of the gear 87. The motion is then transmitted through the bevel gear portion 87*b* to the bevel gear portion 61*b* of the drive cam 61. Hence, the drive cam 61 starts to rotate in the direction of arrow A. Thereupon, the first reversion cam portion 61*c* and second reversion cam portion 61*d* of the drive cam 61 which have so far been in contact with their nearly farthest points from the axis of rotation on the lever portion 62*b* of the first operating lever 62 and the lever portion 63*b* of the second operating lever 63, decrease the distance from the contact point to the axis of rotation as rotation of the drive cam 61 progresses.

Since the spring 70 is forcing the aperture frame 64 to return to the film 13 side, this power turns the first operating lever 62 and the second operating lever 63 about their respective shaft 62*a* and shaft 63*a* in the condition that their respective lever portions 62*b* and 63*b* follow up the first reversion cam portion 61*c* and the second reversion cam portion 61*d* of the drive cam 61. As the drive cam 61 further rotates, the lever portions 62*b* and 63*b* of the first operating lever 62 and the second operating lever 63 are released from the abutting engagement on the first reversion cam portion 61*c* and the second reversion cam portion 61*d* of the drive cam 61. At the same time, the aperture frame 64 is brought into contact with the stoppers 71 by the spring 70. Along with this action the film 13 is pressed together with the light-shielding sheet 14 by the aperture plane 64*a* of the aperture frame 64. Thus, a tension is exerted in the film 13. By this tension, the flatness of the film 13 is sustained. At the same time, by the rigid contact of the aperture frame 64 with the stoppers 71 under the action of the spring 70, the film plane is maintained in the constant position. A further rotation of the motor M2 is controlled in such a manner that when the the mirror drive cam portion 61*e* of the drive cam 61 touches the arm portion 67*a* of the mirror support bracket 67 is detected by the encoder 90 mounted on the drive cam 61, the current supply to the motor M2 is cut off. Thus, the loading operation of a series of such steps is completed, and the camera is made ready to take a first shot.

Figure 12:
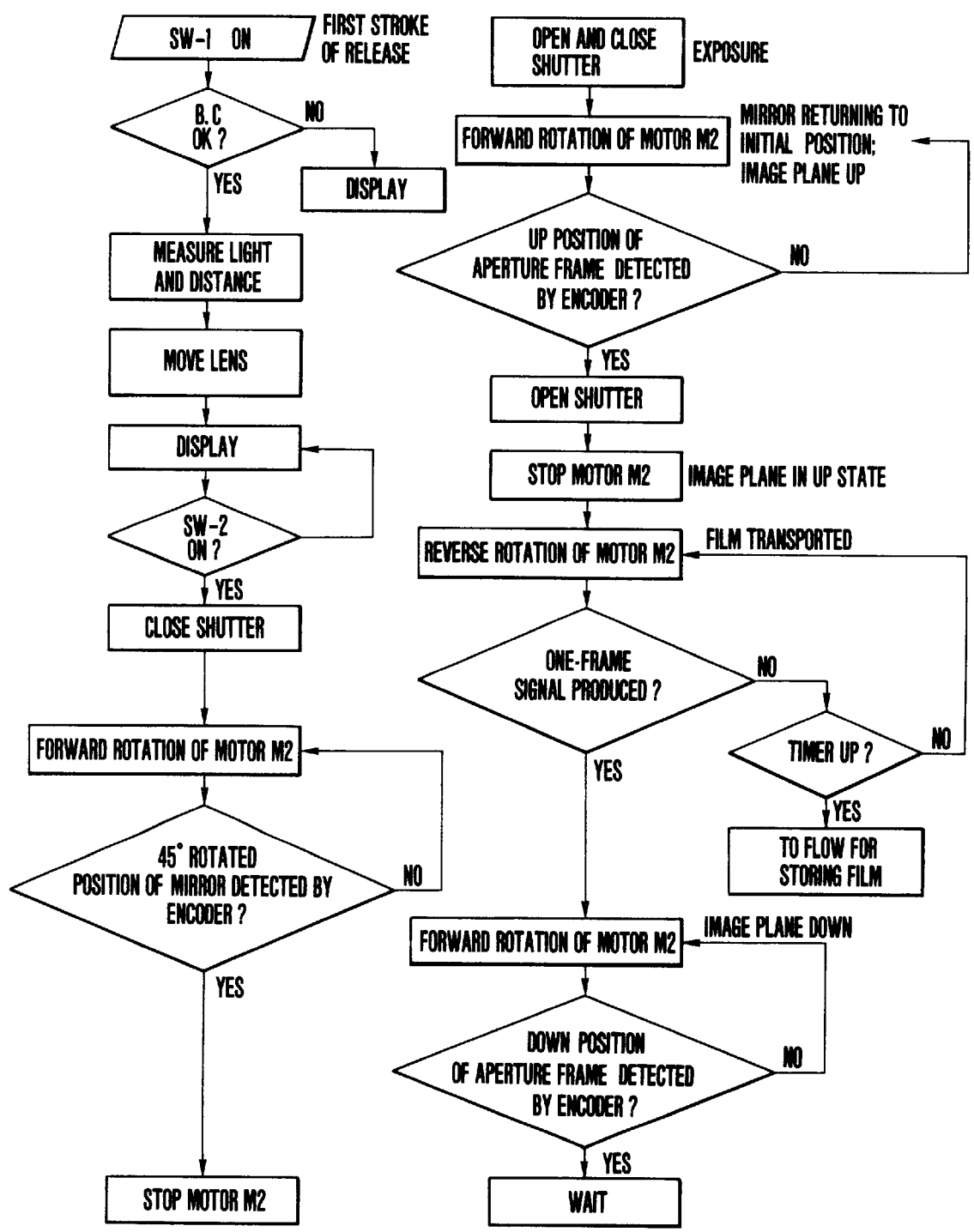

Next, the exposure operation is described by reference to the flowchart of FIG. 12. The photographer first pushes the release button of the camera to a first stroke, thereby turning on a switch 114 (SW-1) to effect checking of the battery. If the actual voltage of the battery is not satisfactory to take shots, a warning signal is applied through the display circuit 106 to an external display device. If the battery voltage is above the satisfactory level, distance measurement and light measurement are carried out and the values are computed by the distance measuring circuit 102 and the light measuring circuit 103, respectively. Their results are applied through the linear IC 101 first to the AF drive circuit 104 by which the photographic lens 2 is axially moved to effect focusing, and stopped in the sharp focus position. This position, or the fact that the image is in sharp focus, is indicated on the external display through the display circuit 106. Upon further depression of the release button to the second stroke, a switch 115 (SW-2) turns on. A diaphragm-cum-shutter which has been open up to now is then once closed. At the same time the motor M2 starts to rotate in the forward direction, for, likewise as before, it rotates the drive cam 61 in the counterclockwise direction of FIG. 7. Since, at this time, the mirror drive cam 61*e* is in an angular position of just before striking the arm portion 67*a* of the mirror support bracket 67, a rotation of the drive cam 61 from the start immediately turns the mirror support bracket 67 about the shaft 68 in the counterclockwise direction in FIG. 10(*a*) to 45° with respect to the optical axis of the photographic lens 2. Based on the output of the encoder 90 representing the rotated position of the drive cam 61, the motor M2 is stopped in coincidence with attainment of the mirror support bracket 67 to 45° rotation. Even if the stopped angular position of the drive cam 61 is more or less deviated from the prescribed one, the angle of the mirror 3 with respect to the film plane can be accurately adjusted to 45°, because that camming surface of the mirror drive cam portion 61*e* which is in contact with the arm portion 67*a* of the mirror support bracket 67 in the 45° rotated position is formed to the round shape with its center at the axis of the shaft 61*a* and the arm portion 67*a* is urged by a spring (not shown) to abut on the mirror drive cam portion 61*e*. At the same time when the motor M2 stops, the shutter drive circuit 105 opens the diaphragm-cum-shutter to an aperture value F previously determined to make a correct exposure based on the result of computation in the light measuring circuit 103. Therefore, the axial ray entering through the photographic lens 2 and the opening of the diaphragm-cum-shutter is changed 90° in direction by the mirror 3 and goes past the opening portion 4 of the aperture frame 64 to a film portion 13*a* in which an image of an object is photographed.

When the exposure reaches a predetermined value, the shutter drive circuit 105 closes the shutter, thus terminating the exposure. Thereupon, the motor control circuit 107 starts again to rotate the motor M2 in the forward direction. As the drive cam 61 rotates, its mirror drive cam portion 61*e* slips out of contact with the arm portion 67*a* of the mirror support bracket 67, permitting the mirror support bracket 67 to turn about the shaft 68 under the action of a spring (not shown) in the clockwise direction to the initial position where the mirror 3 is in contact with the opposite surface of the aperture frame 64 to the aperture plane 64*a*. Again, the camera is switched from the photographing mode to the TTL finder mode. After this, the shutter drive circuit 105 fully opens the shutter again. Then, a further rotation of the drive cam 61 by now brings the first reversion cam portion 61*c* and the second reversion cam portion 61*d* to engagement, respectively on the first lever portion 62*b* of the first operating lever 62 and the lever portion 63*b* of the second operating lever 63, and turns the first operating lever 62 and the second operating lever 63 about the shaft 62*a* and the shaft 63*a* in the clockwise direction. Along with this action, the lever portion 62*c* of the first operating lever 62 and the lever portion 63*b* of the second operating lever 63 engage on the walls 64*g* and 64*h* provided in the projection portion 64*c* and the projection portion 64*d* of the aperture frame 64, respectively, and moves the aperture frame 64 along the shaft 65 and the shaft 66 against the bias force of the spring 70 in the reverse direction back from the film plane. And, from the information of the encoder 90 on the drive cam 61, the drive cam 61 reads out a nearly dead point of its first reversion cam portion 61*c* and its second reversion cam portion 61*d* to the lever portion 62*b* and the lever portion 63*b* of the first operating lever 62 and the second operating lever 63 and causes the motor M2 to stop. By the stopping of the motor M2, the aperture frame 64 is held in the retracted position from the film plane.

Next, the motor M2 starts reverse rotation and rotates the sun gear 83 in the counterclockwise direction through the pinion 80 and the gears 81 and 82. This causes the planet gear 84 to revolve in the counterclockwise direction, while rotating about its own axis in the clockwise direction, until it engages the gear 15b of the film take-up shaft 15. The film 13 is then wound by one frame around the take-up shaft 15. When the length of one frame of the film 13 has been fed, a one-frame indexing switch 116 turns on to stop the motor M2 from the reverse rotating. Responsive to the stoppage, the motor control circuit 107 commands the motor M2 to start again the forward rotation. Thereby, the first reversion cam portion 61c and the second reversion cam portion 61d of the drive cam 61 are moved away from the angular position where their tips or points close thereto are in contact with the lever portion 62b of the first operating lever 62 and the lever portion 63b of the second operating lever 63. As rotation of the drive cam 61 continues, their contact points approach the axis of rotation.

Thereupon, the spring 70 urging the aperture frame 64 to return toward the film plane acts on the first operating lever 62 and the second operating lever 63 to turn about their respective shafts 62a and 63a in the counterclockwise direction with their respective lever portions 62b and 63b following up the first reversion cam portion 61c and the second reversion cam portion 61d respectively. When the drive cam 61 has rotated about ¼ revolution, the first operating lever 62 and the second operating lever 63 are released from the reaction of their respective lever portions 62b and 63b to the first reversion cam portion 61c and the second reversion cam portion 61d of the drive cam 61, thus permitting the aperture frame 64 to be pressed against the stopper 71 by the spring 70 in the position of FIG. 9(b). Along with this action, the film 13 is put on the aperture plane 64a together with the light-shielding sheet 14 under pressure. Therefore, the film 13 is set in a tension applied state. The motor M2 further continues rotating in the forward direction. When the encoder 90 mounted on the drive cam 61 has found that the mirror drive cam portion 61e is about to strike the arm portion 67a of the mirror support bracket 67, the motor M2 is stopped by the motor control circuit 107. Thus, one cycle of film winding operation is completed. The camera is now ready to take the next shot.

Figure 13:
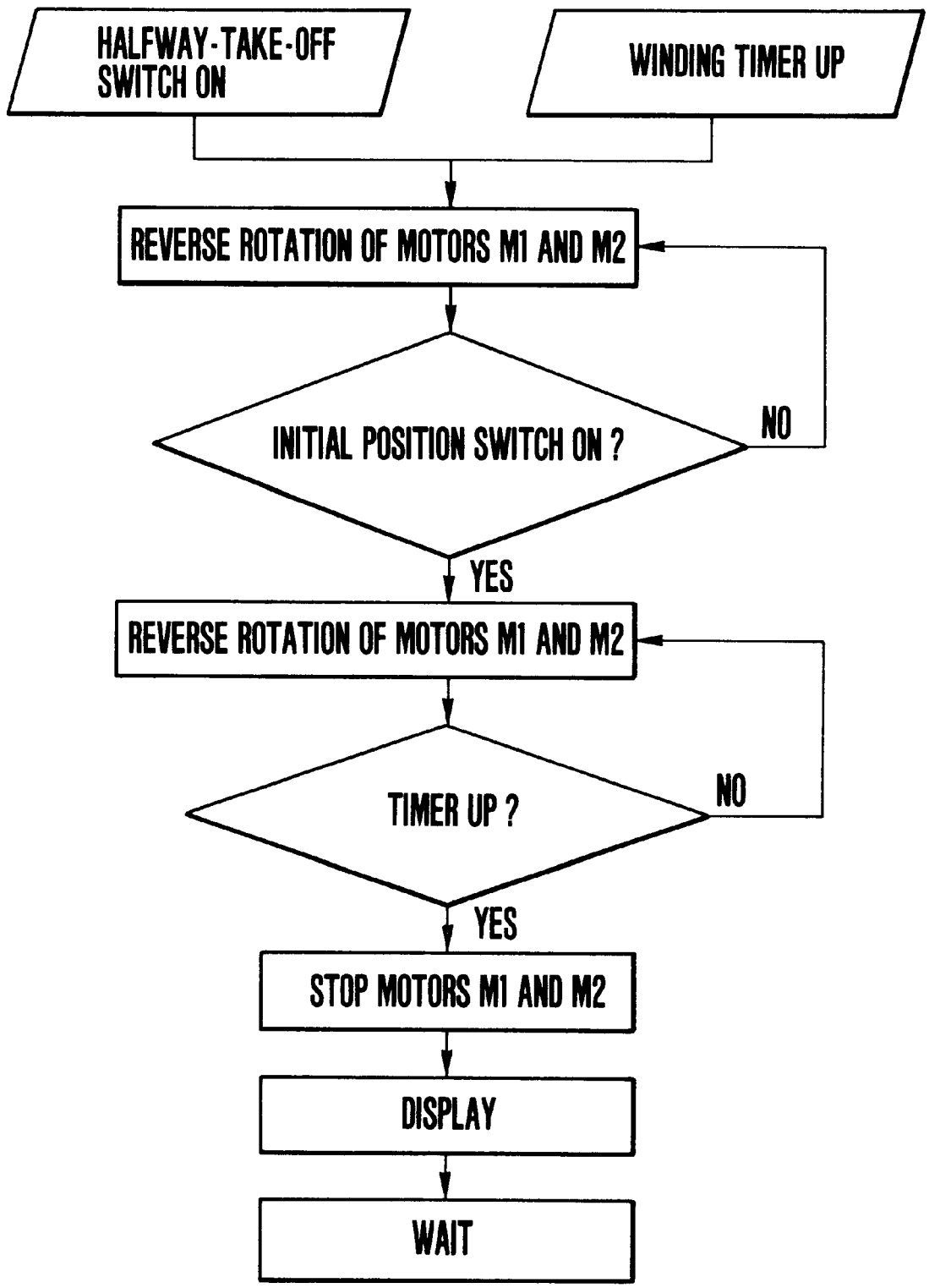

Meanwhile, if despite the motor M2 rotating in the reverse direction, the one-frame indexing switch 116 remains open for a predetermined certain time, as it implies that the film has been used up to the last frame, the film wind mode shifts to a film storing mode. This mode is next described with reference to the flowchart of FIG. 13. The transition to the film restoring mode occurs not only in automatic response to end of the filming, but also for the purpose of taking out the film cartridge in the middle of the filming course. In the latter case, the photographer operates a control knob (not shown) to turn on an interruption switch 117, thereupon switching the camera to the film storing mode. To store the film, the motor M1 and the motor M2 are first started at the same time to rotate both in the reverse direction. The reverse motion of the motor M1 is transmitted through the worm gear 52 and the gears 53, 54 and 55 to rotate the first feed screw 56 in the clockwise direction in FIG. 4, and therefrom through the belt 57 to rotate the second feed screw 58 also in the same direction. Since the upper and lower guide pins 17b of the movable shaft 17 are respectively in the fitted lead grooves 56c and 58c of the first feed screw 56 and the second feed screw 58, the movable shaft 17 moves back to the film cartridge 5. Because the motor M2 is simultaneously rotating in the reverse direction, the slackened film 13 and the light-shielding sheet 14 are taken up around the film take-up shaft 15. Eventually the movable shaft 17 enters the mouth 5e of the cartridge body 5a, thereupon turning on an initial position sensing switch 118. At the same time, the guide pins 17b of the movable shaft 17 turn the memory lever 23 about the shaft 5g in the clockwise direction against the bias force of the spring 24. Therefore, the extension portion 23a of the memory lever 23 releases the free end portion 20a of the cartridge shutter 20 from the locking connection. The bias force of the spring 21 then turns the shutter 20 about the shaft 5f in the counterclockwise direction. When the edge of the free end 20a moves in the fitted groove for light shielding of the cartridge body 5a and covers the mouth 5e, the film storing operation is completed. Even after the initial position sensing switch 118 has turned on, the motor M1 and the motor M2 continue reverse rotating so that the slack film convolution on the take-up shaft 15 is tightened within the cartridge body 5a. After a predetermined time has passed, the microcomputer 110 commands the motor control circuit 107 through the linear IC 101 to stop the motor M1 and the motor M2 from their reverse rotating. The display circuit 106 makes a display indicating that the film storing operation has been completed. Thus, the film storing operation of a series of such steps is completed.

To take the film cartridge 5 out of the camera body 1, the photographer then operates a knob (not shown) for opening and closing the back cover 12. So the engagement portion of this knob is disengaged from the lock portion 12d of the back cover 12. As the back cover 12 has pushed the lock pawl 22 by its projection portion 12b, the returning force stored on the lock pawl 22 drives the back cover 12 to turn about the shaft 12a in the counterclockwise direction to a half open position shown in FIG. 3(f). Then, the photographer will fully open the back cover 12. At a time when the hook portion 12c has moved the distance δ shown in FIG. 3(e), it catches the projection portion 5h of the cartridge body 5a. A further opening brings the film cartridge 5 into half protrusion out of the camera body 1, as shown in FIG. 3(b). Hence, the photographer is able to pick up the film cartridge with ease.

What is claimed is:

1. A camera for use with a film cartridge, the film cartridge including a film, a film chamber that holds the film, a movable member movable to advance a portion of a film fully contained within the film chamber to the exterior of the film chamber, a locking member for locking the movable member so as to prevent the movable member from moving, the locking member being movable between a lock position and an unlock position and having a predetermined moving portion that moves with movement of the locking member, and holding means for holding the locking member in the lock position, the holding means including a contact portion contactable with the predetermined moving portion to restrict movement of the locking member, the camera comprising:

a cartridge chamber;

release means for releasing a contact state between the contact portion of the holding means and the predetermined moving portion, thereby to release the locking member and permit the locking member to move to the unlock position; and drive means for driving movement of the movable member at least when said release means releases the contact state between the contact portion of the holding means and the predetermined moving portion of the locking member.

2. A camera according to claim 1, wherein said release means includes means for enabling the holding means to release the locking member when the film cartridge is loaded in a predetermined state in the cartridge chamber.

3. A camera according to claim 2, wherein said cartridge chamber includes a cover member, and said release means includes means for causing the holding means to release the locking member when said cover member is closed and a film cartridge is loaded in said cartridge chamber.

4. A camera according to claim 1, wherein the locking member includes means for moving the locking member between the lock position and the unlock position.

5. A camera according to claim 4, wherein the predetermined moving portion is a contact portion of the locking member, and the contact member of the holding means contacts the contact portion of the locking member to restrict movement of the locking member from the lock position to the unlock position.

6. A camera according to claim 5, wherein said release means includes means for releasing contact between the contact member of the holding means and the contact portion of the locking member.

7. A camera according to claim 1, wherein said drive means includes means for starting a drive operation of the movable member when said release means releases contact between the contact member of the holding means and the predetermined moving portion movable with the locking member.

8. A camera according to claim 7, wherein said drive means includes means for determining that said release means has released the locking member, and means for starting a drive operation of the movable member when said determining means determines said release means has released the locking member.

9. A camera according to claim 1, wherein said drive means includes means for driving the movable member to advance the portion of the film from the film chamber to a position at which exposure is effected.

10. A camera according to claim 1, wherein said drive means includes means for contacting the movable member so as to transmit a drive force to the movable member.

11. A camera according to claim 1, wherein the movable member is a spool.

* * * * *

UNITED STATES PATENT AND TRADEMARK OFFICE
CERTIFICATE OF CORRECTION

PATENT NO. : 6,074,107
DATED : June 13, 2000
INVENTOR(S) : Daisuke Sahori, et al.

Page 1 of 1

It is certified that error appears in the above-identified patent and that said Letters Patent is hereby corrected as shown below:

[75] Inventors:
"Both of Kanagawa-ken" should read -- both of Yokohama, --.

Column 1,
Line 32, "right" should read -- the right --;
Line 66, "U-turn" should read -- a U-turn --.

Column 4,
Line 62, "a a" should read -- a --.

Column 5,
Line 2, "it" should read -- its --;
Line 47, "ends" should read -- end --.

Column 6,
Line 2, "an" should read -- a --.

Signed and Sealed this

Thirty-first Day of July, 2001

Attest:

NICHOLAS P. GODICI
Attesting Officer
Acting Director of the United States Patent and Trademark Office